US006640115B1

(12) United States Patent
Fujimoto et al.

(10) Patent No.: US 6,640,115 B1
(45) Date of Patent: Oct. 28, 2003

(54) RADIO COMMUNICATION APPARATUS HAVING SPEED JUDGING CIRCUITRY

(75) Inventors: Masanobu Fujimoto, Higashihiroshima (JP); Hisashi Ide, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/282,187

(22) Filed: Mar. 31, 1999

(30) Foreign Application Priority Data

Apr. 1, 1998 (JP) ............................................ 10-088914

(51) Int. Cl.[7] ................................................ H04Q 7/32
(52) U.S. Cl. ..................................... 455/567; 455/412.2
(58) Field of Search ................................. 455/567, 550, 455/575, 569, 566, 441, 444, 443, 412.1, 412.2

(56) References Cited

U.S. PATENT DOCUMENTS

| | | | |
|---|---|---|---|
| 5,140,695 A | * 8/1992 | Yasuda et al. | 455/34.1 |
| 5,396,645 A | * 3/1995 | Huff | 455/33.4 |
| 5,530,910 A | * 6/1996 | Taketsugu | 455/444 |
| 5,822,697 A | * 10/1998 | Matsuzawa | 455/444 X |
| 6,014,566 A | * 1/2000 | Owada | 455/444 X |
| 6,108,532 A | 8/2000 | Matsuda et al. | |

FOREIGN PATENT DOCUMENTS

EP 0 851 699 A2 7/1998

(List continued on next page.)

OTHER PUBLICATIONS 4.4.3.8.2 Incoming Call, Second–Generation Cordless Telephone System Standard (RCR–ST28), version 2, Association of Radio Industries and Business, Dec. 26, 1995, pp. 395–398.

Primary Examiner—Nay Maung
Assistant Examiner—Philip J. Sobutka
(74) Attorney, Agent, or Firm—Nixon & Vanderhye, P.C.

(57) ABSTRACT

An object of the invention is to control an incoming call response operation on the basis of the movement speed of a radio telephone apparatus. In a radio communication system including a plurality of base stations, a multiplicity of mobile stations and a network control station (exchange station) that controls these stations, a radio telephone apparatus is used as a mobile station and performs radio communication with a base station through an antenna. A base station ID management circuit monitors a base station which can perform radio communication and grasps a the condition of the connection with the base station. A base station ID switching frequency counting circuit counts the number of times N the communication possible base station has been switched within a unit time counted by a timer counter. A control circuit compares N and a reference number of times N0 and judges that the radio telephone apparatus is moving at high speed when N>N0. A response judgment circuit controls the radio telephone apparatus so that a response operation is not performed, that incoming call notification is provided by an incoming call notification portion or that caller information is outputted by a caller information notification portion when a call arrives while the radio telephone apparatus is moving at high speed. An incoming call operation is performed even while the radio telephone apparatus is moving at high speed, so that the user can be notified of the arrival of a call.

28 Claims, 17 Drawing Sheets

FOREIGN PATENT DOCUMENTS

| | | |
|---|---|---|
| JP | 56-110356 A | 9/1981 |
| JP | 56-117444 A | 9/1981 |
| JP | 63-14526 A | 1/1988 |
| JP | 2-65536 A | 3/1990 |
| JP | 3-104330 A | 5/1991 |
| JP | 4-37390 A | 2/1992 |
| JP | 4-373347 A | 12/1992 |
| JP | 6-133355 A | 5/1994 |
| JP | 7-23455 A | 1/1995 |
| JP | 7-115680 A | 5/1995 |
| JP | 9-84093 A | 3/1997 |
| JP | 10-190557 A | 7/1998 |
| JP | 10-210143 A | 8/1998 |
| JP | 10-224856 A | 8/1998 |
| JP | 10-234076 A | 9/1998 |
| JP | 10-243465 A | 9/1998 |
| JP | 10-285649 A | 10/1998 |
| JP | 11 187091 A | 7/1999 |

\* cited by examiner

PS: PERSONAL STATION
CS: CELL STATION

RADIO COMMUNICATION APPARATUS HAVING SPEED JUDGING CIRCUITRY

BACKGROUND OF THE INVENTION

1. Field of the Invention

The present invention relates to a radio telephone apparatus for use in, for example, a PHS (personal handy phone system).

2. Description of the Related Art

A radio telephone apparatus is generally used as a mobile station in a communication system such as a PHS including a mobile station, a plurality of base stations and a network control station that controls these stations. When a radio connection to a base station is made while a user carrying the radio telephone apparatus is moving at high speed, for example, in a car or on a train, the network control station tries to hold the radio connection and frequently switches the radio connection to a base station corresponding to the radio area in which the mobile station is currently situated. In a case where the radio area of each base station is comparatively large, even when the user is moving at high speed, it is possible to perform telephone conversation for a short time by performing an incoming call operation to detect incoming call notification from the base station and performing a response operation to respond to the incoming call notification. In the radio telephone apparatus, the type of the ringing tone and the activation or deactivation of output of various notification tones such as a key operation tone and an alarm tone can be preset, and the radio telephone apparatus operates on the basis of the contents of the setting. The radio telephone apparatus performs an automatic response operation and an automatic recording response operation on the basis of the contents of the presetting made by the user.

For example, a prior art disclosed in Japanese Unexamined Patent Publication JP-A 6-133355 relates to a location registration operation performed when the user is moving at high speed in a digital cordless telephone system. The system comprises an exchange station, a plurality of base stations, a multiplicity of mobile stations that move together with the users and an information storage control apparatus. The base stations are connected to the exchange station through a communication network. The information storage control apparatus is connected to the exchange station directly or through the communication network. The mobile stations each exchange conversation or control data by radio with a base station corresponding to, of the radio areas inherent in the base station, the area in which the mobile station is currently situated. The mobile station issues a location registration request when confirming that the area in which the mobile station is currently situated is the radio area of a base station. The location registration request is written into the information storage control apparatus through the base station and the exchange station. Then, the mobile station is notified of confirmation on the opposite path, so that the position registration operation is completed. When a call for a mobile station arrives, on the basis of the information registered in the information storage control apparatus, the base station in which the mobile station is situated or the grouped base stations in the periphery of the base station are accessed by way of the exchange station to call the mobile station. The conversation channel from the calling station to the called station is thus connected.

In the prior art, when the mobile station is moving at a comparatively low speed such as a walking speed, telephone conversation can be smoothly performed because the radio area of the base station is hardly changed. However, when the mobile station is moving at a comparatively high speed such as when the user of the mobile station is in a car or on a train, the base station is frequently changed because the radio area is small. When the base station is more frequently changed, the telephone communication is interrupted or it becomes impossible to receive a call, so that the channel is disconnected.

JP-A 6-133355 discloses an art relating to control of the location registration operation. The location registration operation is performed when a mobile station moves out of the area of the grouped base stations in the call waiting state. The location registration operation is not performed when a mobile station is moved from a base station to another within the area. The above-mentioned problem arises when the mobile station is moving at high speed from a base station to another within the area.

Since the mobile stations operate on the basis of the type of the ringing tone and on the activation or deactivation of output of various notification tones, unless a special setting is made, the notification tones are outputted even when the user of the mobile station is in a public space such as on a train. This makes people around the user unpleasant. In addition, even when the user of the mobile station does not want to perform telephone conversation such as when the user is driving a car, the user who is the driver is forced to perform telephone conversation unless a special setting such as automatic recording response is made.

SUMMARY OF THE INVENTION

An object of the present invention is to provide a very convenient radio telephone apparatus capable of surely notifying the user of the arrival of a call by controlling an incoming call response operation of the radio telephone apparatus on the basis of the movement speed of the apparatus.

The invention provides a radio telephone apparatus which serves as a mobile station that performs radio telephone communication with another station through one of a plurality of base stations having at least one radio communication area, and is provided with incoming call operation performing means for detecting incoming call notification from a base station and response operation performing means for responding to the incoming call notification, the radio telephone apparatus comprising:

monitoring means for monitoring a base station which can perform communication with the radio telephone apparatus, and grasping a condition of connection with the base station;

judging means for judging whether the radio telephone apparatus is moving at high speed or not on the basis of the connection condition; and response controlling means for controlling the response operation performing means so as not to perform an operation to respond to a calling station after an incoming call operation is performed, when the judging means judges that the radio telephone apparatus is moving at high speed during the incoming call operation.

According to the invention, in the radio telephone apparatus serving as a mobile station being movable, a base station which can perform communication is always monitored and the condition of connection with the base station is grasped. Based on the connection condition, it is judged whether the apparatus is moving at high speed or not. For example, the number of times the communication possible base station has been switched within a predetermined unit time is counted, the counted number of times and a predetermined number of times are compared, and when the counted number of times exceeds the predetermined number of times, it is judged that the radio telephone apparatus is moving at high speed. Instead of making the judgment on the basis of the number of times of switching of the base station like this, the radio telephone apparatus may be judged as moving at high speed when a clocked time is shorter than a predetermined time like in JP-A 6-133355. During the incoming call operation performed by the radio telephone apparatus, the response operation is performed on the basis of the judgment result of the movement speed of the radio telephone apparatus. However, the incoming call operation is performed irrespective of the movement speed of the radio telephone apparatus, that is, even when the radio telephone apparatus is moving at high speed. Consequently, the user of the radio telephone apparatus can be notified of the arrival of a call irrespective of the movement speed. During the incoming call operation performed by the radio telephone apparatus, the operation to respond to the calling station is not performed when the radio telephone apparatus is moving at high speed. The incoming call operation is performed even in such a case. Consequently, it is possible to refuse an incoming call whose connection is interrupted because such a call is meaningless.

In the invention it is preferable that the radio telephone apparatus comprises incoming call notifying means for providing incoming call notification on the basis of the control by the response controlling means when the radio telephone apparatus performs the incoming call operation.

According to the invention, the user is notified of the arrival of a call at the radio telephone apparatus on the basis of the control by the response controlling means, that is, on the basis of the movement speed.

In the invention it is preferable that the incoming call notifying means is a sound output device and outputs no sound when the radio telephone apparatus is moving at high speed.

According to the invention, the user is surely notified of the arrival of a call by sound when the radio telephone apparatus is not moving at high speed, that is, when the apparatus is moving at low speed or stationary. When the apparatus is moving at high speed, no sound is outputted. The user is very likely to be in a public space such as on a train when the radio telephone apparatus is moving at high speed. Therefore, by not providing incoming call notification by sound when the radio telephone apparatus is moving at high speed, it does not occur that people around the user are made unpleasant. When the user of the radio telephone apparatus is, for example, driving a car, since the user is not forced to respond to a call, it is unnecessary to perform telephone communication, so that the user is not hindered from driving.

In the invention it is preferable that the incoming call notifying means is a sound and vibration output device, and outputs vibration when the radio telephone apparatus is moving at high speed and outputs sound when the radio telephone apparatus is not moving at high speed.

According to the invention, when the radio telephone apparatus is not moving at high speed, the user is surely notified of the arrival of a call by sound. When the radio telephone apparatus is moving at high speed, vibration is outputted without outputting sound. By not providing incoming call notification by sound when the radio telephone apparatus is moving at high speed, it does not occur that people around the user of the radio telephone apparatus are made unpleasant, and by providing incoming call notification by vibration, the user is surely notified of the arrival of a call.

In the invention it is preferable that the radio telephone apparatus comprises information outputting means for outputting caller information from the calling station when the radio telephone apparatus is moving at high speed during the incoming call operation.

According to the invention, caller information is outputted even if an incoming call is refused when the radio telephone apparatus is moving at high speed during the incoming call operation. Consequently, the user of the radio telephone apparatus can be surely notified of the arrival of a call and can identify the caller. When the user cannot immediately respond to an incoming call like when the user is on a train or driving a car, the user can easily call the caller back at an arbitrary time on the basis of the caller information.

In the invention it is preferable that the radio telephone apparatus comprises:
  a sound output device for outputting sound such as a key operation tone and an alarm tone; and
  sound output controlling means for controlling the sound output device so as not to output sound on the basis of control by the response controlling means when the radio telephone apparatus is moving at high speed.

According to the invention, when the radio telephone apparatus is moving at high speed, sound output by the radio telephone apparatus is stopped irrespective of the presence or absence of incoming call notification. Consequently, the user of the radio telephone apparatus is not forced to respond to an incoming call, so that the user is never hindered, for example, from driving a car.

In the invention it is preferable that the radio telephone apparatus comprises:
  reproducing means for reproducing a predetermined message; and
  reproduction controlling means for controlling the operation performed by the reproducing means so as to reproduce the message on the basis of control by the response controlling means, and sending the reproduced message to the calling station when the radio telephone apparatus is moving at high speed during the incoming call operation.

According to the invention, when the radio telephone apparatus is moving at high speed during the incoming call operation, a predetermined message, for example, a message "This telephone is moving now. Please call again later." showing that the radio telephone apparatus is moving at high speed can be sent to the calling station. This frees the user of the radio telephone apparatus from being forced to respond to an incoming call, so that the user is never hindered, for example, from driving a car. The user of the calling station can immediately grasp the condition of the mobile station and disconnect the line.

In the invention it is preferable that the radio telephone apparatus comprises:
  reproducing means for reproducing a predetermined message;
  reproduction controlling means for controlling the operation performed by the reproducing means so as to reproduce the message on the basis of the control by the response controlling means, and sending the reproduced message to the calling station when the radio telephone apparatus is moving at high speed during the incoming call operation; and
  recording means for recording a message from the calling station responding to the reproduced message being sent.

According to the invention, since the message from the calling station to which the reproduced message is sent can be recorded at the time of automatic response, the user of the radio telephone apparatus never misses the business of an incoming call. Since the user of the calling station can send the business of the call, it is unnecessary to call again. Consequently, the user is never made unpleasant.

The invention provides a radio telephone apparatus comprising:

first communication mode executing means for performing radio telephone communication between a mobile station and another station through one of a plurality of base stations having at least one radio communication area;

second communication mode executing means for directly performing radio communication between mobile stations;

mode selecting means for selecting either the first or the second communication mode by switching therebetween;

incoming call operation performing means for performing an incoming call operation to detect incoming call notification from a base station;

response operation performing means for performing a response operation to respond to the incoming call notification;

monitoring means for monitoring a base station which can perform radio communication with the radio telephone apparatus serving as a mobile station, and grasping the condition of connection with the base station; and judging means for judging whether the radio telephone apparatus is moving at high speed or not on the basis of the connection condition, wherein the mode selecting means selects the second communication mode when the radio telephone apparatus is moving at high speed during the incoming call operation.

According to the invention, the radio telephone apparatus selectively executes either the first communication mode employing a PHS, etc. or the second communication mode by the general radio by switching between the two modes. Consequently, an appropriate communication mode can be executed in accordance with the movement speed of the radio telephone apparatus, so that telephone communication can be performed with stability irrespective of the movement speed of the radio telephone apparatus. When the radio telephone apparatus performs the incoming call operation while moving at high speed within the radio area of a base station, the radio telephone apparatus selects and executes the second communication mode. Consequently, when the radio telephone apparatus is comparatively near the calling station, telephone communication can be performed with stability even if the radio telephone apparatus is moving at high speed.

BRIEF DESCRIPTION OF THE DRAWINGS

Other and further objects, features, and advantages of the invention will be more explicit from the following detailed description taken with reference to the drawings wherein.

DETAILED DESCRIPTION OF THE PREFERRED EMBODIMENTS

Figure 1:
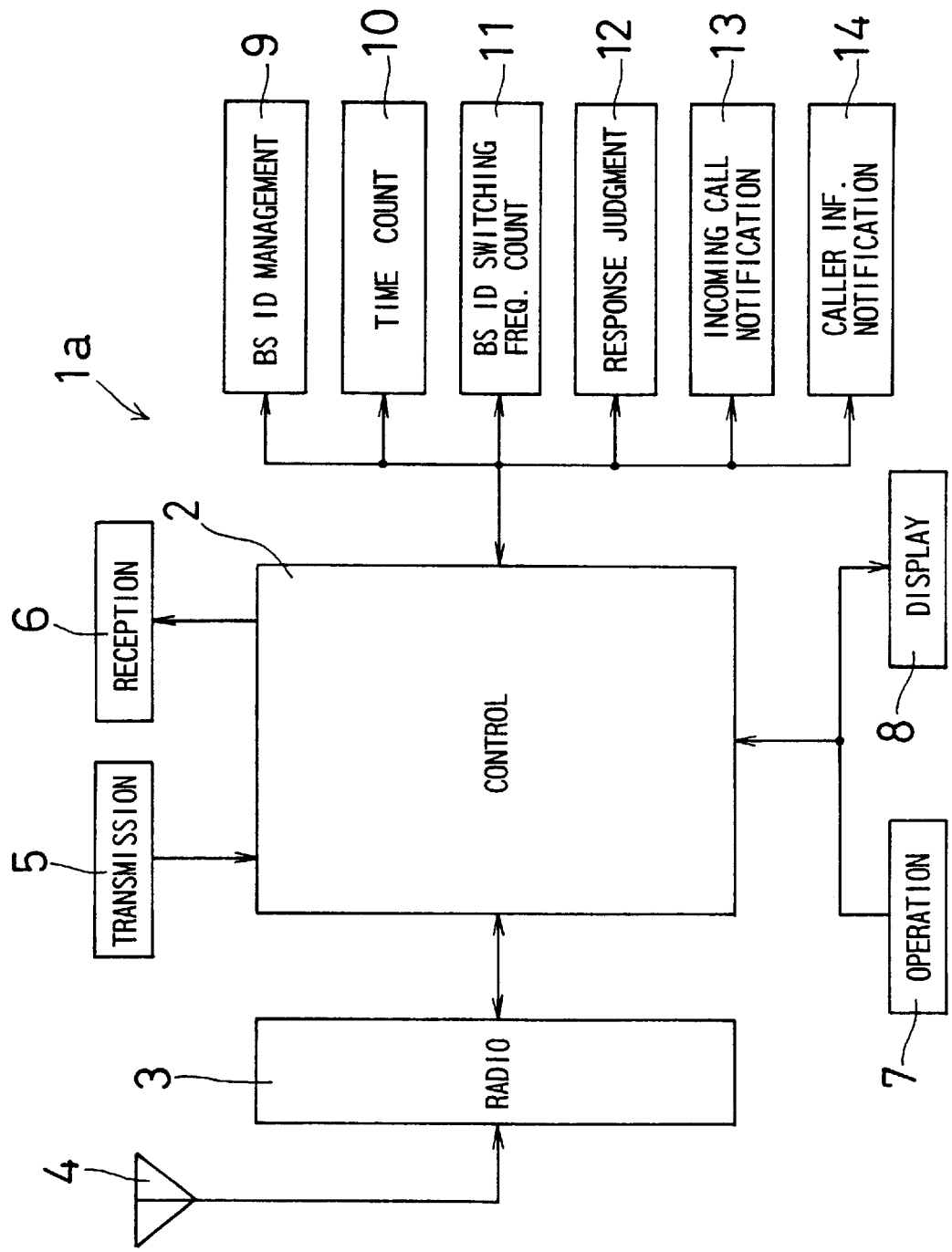
FIG. 1 is a block diagram showing a radio telephone apparatus 1a according to a first embodiment of the present invention.

Now referring to the drawings, preferred embodiments of the invention are described below.

FIG. 1 is a block diagram showing the electric structure of a radio telephone apparatus 1a according to a first embodiment of the present invention. The radio telephone apparatus 1a is used, for example, as a mobile station in a PHS (personal handy phone system). The PHS comprises a plurality of base stations, a multiplicity of mobile stations and a network control station (exchange station) that comprehensively controls these stations. The base stations are connected to the exchange station through a communication network. The mobile stations each exchange voice data or communication control data by radio with a base station corresponding to, of the radio areas inherent in the base station, the area in which the mobile station is currently situated. Thus, the mobile stations perform telephone communication with called stations through base stations and the exchange station. The base station having received a call signal from the exchange station notifies the mobile station of the arrival of a call. The mobile station performs an incoming call operation to detect the incoming call notification and performs a response operation to respond to the incoming call notification.

The radio telephone apparatus 1a serving as such a mobile station comprises a control circuit 2, a radio portion 3, an antenna 4, a telephone transmitter 5, a telephone receiver 6, an operation portion 7, a display portion 8, a base station ID management circuit 9, a timer counter 10, a base station ID switching frequency counting circuit 11, a response judgment circuit 12, an incoming call notification portion 13 and a caller information notification portion 14.

The control circuit 2 realized, for example, in the form of a CPU (central processing unit) controls the operation of the entire apparatus. The radio portion 3 realized in the form of a radio converts sound signals and telephone communication control signals from the control circuit 2 into radio signals, and transmits the radio signals from the antenna 4. The radio portion 3 also converts radio signals received through the antenna 4 into sound signals and control signals, and supplies the signals to the control circuit 2. Radio communication with a base station is thus performed through the antenna 4. The telephone transmitter 5 collects peripheral sounds, converts the sounds into sound signals, and supplies the sound signals to the control circuit 2. The telephone receiver 6 converts the sound signals received through the antenna 4 into sounds, and outputs the sounds. The operation portion 7 has a dial key for inputting a telephone number, a telephone communication key for performing telephone communication with another station through the mobile station and the exchange station, and an OFF key for disconnecting the line. The display portion 8 is realized, for example, in the form of an LED (light emitting diode) or an LCD (liquid crystal display), and displays a dial number and other information. The control circuit 2, the radio portion 3, the antenna 4, the telephone transmitter 5, the telephone receiver 6, the operation portion 7 and the display portion 8 are typically included in radio telephone apparatuses. Subsequently, elements particular to the invention will be described.

The base station ID management circuit 9 associated with the monitoring means monitors a base station which can perform radio communication with the radio telephone apparatus 1a serving as a mobile station, grasps the condition of the connection between the radio telephone apparatus 1a and the base station, and stores the ID (identification information) of the communication possible base station into a memory M provided in the management circuit 9. The base station ID management circuit 9 stores 0 into the memory M, for example, when the radio telephone apparatus 1a is situated outside the radio area of the base station and there is no base station that can perform communication.

The timer counter 10 associated with the judging means for judging whether the radio telephone apparatus 1a is moving at high speed or not on the basis of the connection condition grasped by the base station ID management circuit 9 counts a predetermined unit time. The base station ID switching frequency counting circuit 11 also associated with the judging means counts the number of times N the communication possible base station has been switched within the counted unit time. The control circuit 2 also associated with the judging means compares the number of times of switching N counted by the base station ID switching frequency counting circuit 11 with a predetermined reference number of times N0, and judges whether the counted number of times of switching N exceeds the reference number of times N0 or not. Specifically, when the number of times of switching N exceeds the reference number of times N0 (N>N0), the control circuit 2 judges that the radio telephone apparatus 1a is moving at high speed, and sets a flag S provided in the control circuit 2 to 1. When the number of times of switching N does not exceed the reference number of times N0 (N<N0), the control circuit 2 judges that the radio telephone apparatus 1a is not moving at high speed, that is, that the radio telephone apparatus 1a is moving at low speed or stationary, and sets the flag S to 0.

The response judgment circuit 12 associated with the response controlling means controls the response operation in accordance with the movement speed of the radio telephone apparatus 1a, that is, in accordance with the value of the flag S. Specifically, when the flag S is 1, that is, it is judged that the radio telephone apparatus 1a is moving at high speed during the incoming call operation performed by the radio telephone apparatus 1a, as a first operation, the response judgment circuit 12 controls the response operation so as not to be performed. As a second operation, the response judgment circuit 12 causes the incoming call notification portion 13 realized in the form of a tone ringer or a vibration output device to notify the user of the radio telephone apparatus 1a of the arrival of a call. As a third operation, the response judgment circuit 12 causes the caller information notification portion 14 realized in the form of a sound synthesis circuit or a display device to output caller information from the calling station, for example, the caller's telephone number. These first to third operations may be performed singly or may be performed in combination, such as in a combination of the first and the second operations, the first and the third operations, the second and the third operations, or the first to third operations.

Figure 2:
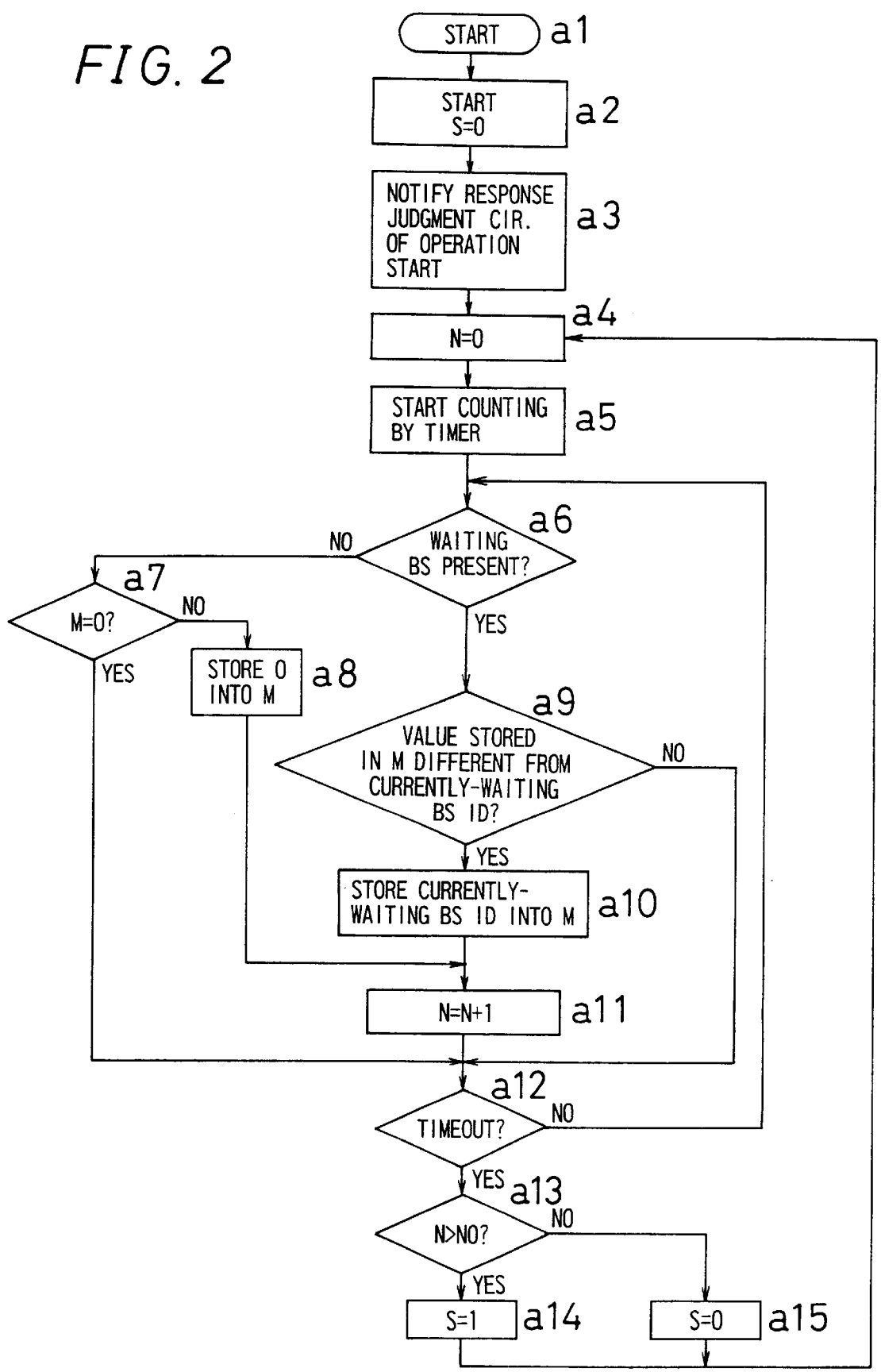
FIG. 2 is a flowchart for explaining a switching frequency counting operation performed by a base station ID switching frequency counting circuit 11 during a first operation.

FIG. 2 is a flowchart for explaining the switching frequency counting operation performed by the base station ID switching frequency counting circuit 11 during the first operation. The first operation is realized by the base station ID management circuit 9, the timer counter 10, the base station ID switching frequency counting circuit 11 and the response judgment circuit 12.

When the switching frequency counting operation is started at step a1, the process proceeds to step a2, where the flag S is set to 0. Then, the process proceeds to step a3. At step a3, the response judgment circuit 12 is notified of the start of the operation. At the next step a4, the number of times of switching N is set to 0 and the process proceeds to step a5. At step a5, the timer counter 10 starts counting the unit time, and the process proceeds to step a6. At step a6, it is judged whether a base station in call waiting state, that is, a base station which can perform communication is present or not. When such a base station is present, the process proceeds to step a9. When such a base station is absent, the process proceeds to step a7.

At step a7, it is judged whether the memory M is 0 or not. When M=0, the process proceeds to step a12. When M≠0, the process proceeds to step a8, where 0 is stored into the memory M. Then, the process proceeds to step a11. At step a9, it is judged whether or not the base station ID stored in the memory M is different from the ID of the base station currently in call waiting state. When the IDs are different from each other, the process proceeds to step a10. When the IDs are the same, the process proceeds to step a12. At step a10, the ID of the base station currently in call waiting state is stored into the memory M, and the process proceeds to step a11. At step a11, the number of times of switching N of the base station ID switching frequency counting circuit 11 is set to N+1, and the process proceeds to step a12.

At step a12, steps a6 to a11 are repeated until the timeout of the unit time counting started at step a5. When the timeout occurs, the process proceeds to step a13, where the number of times of switching N is compared with the predetermined reference number of times N0 to judge whether N exceeds N0 or not. When N>N0, the process proceeds to step a14. When N≦N0, the process proceeds to step a15. At step a14, the flag S is set to 1, and at step a15, the flag S is set to 0. Then, the process returns to step a4.

Figure 3:
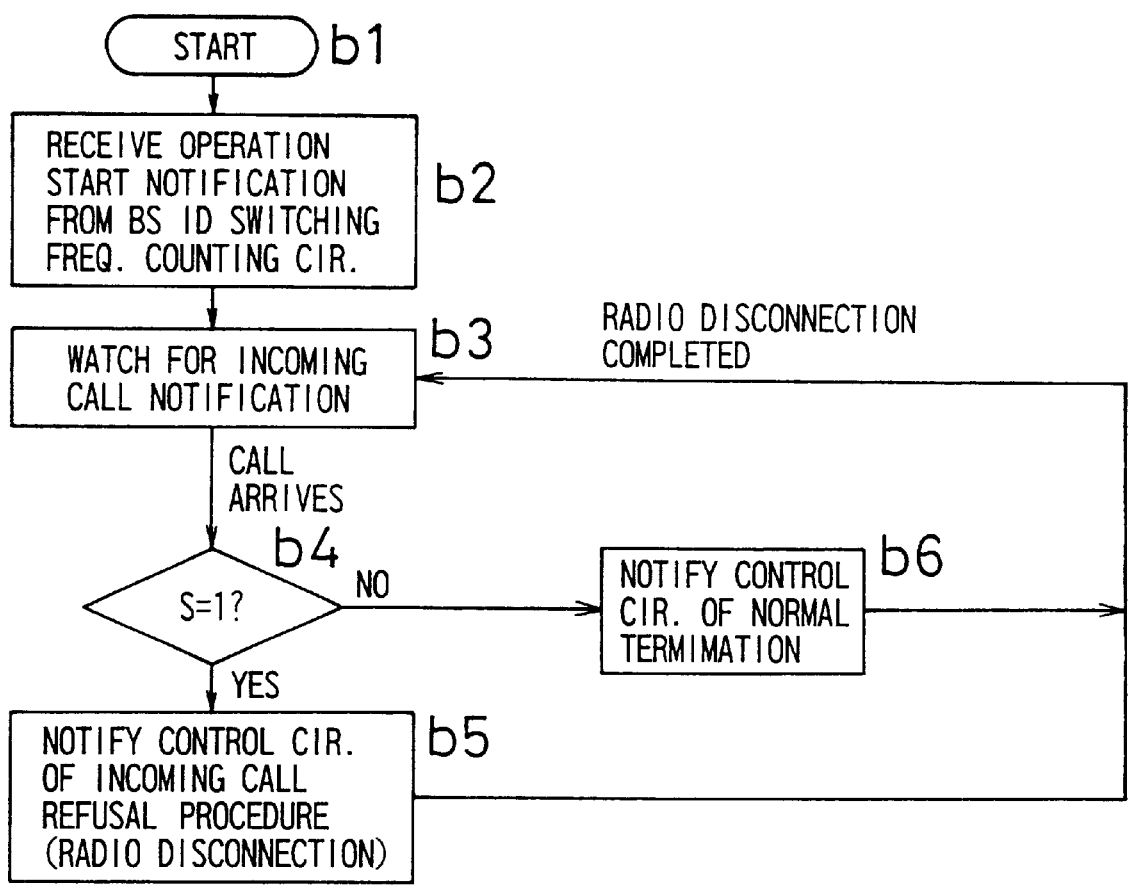
FIG. 3 is a flowchart for explaining a judgment operation performed by a response judgment circuit 12 during the first operation.

FIG. 3 is a flowchart for explaining a judgment operation performed by the response judgment circuit 12 during the first operation. When the judgment operation is started at step b1, the process proceeds to step b2, where operation start notification from the base station ID switching frequency counting circuit 11 is received. At the next step b3, incoming call notification from a base station is watched for. When incoming call notification arrives, the process proceeds to step b4, where it is judged whether or not the flag S=1, that is, whether the radio telephone apparatus 1a is moving at high speed or not. When S=1, the process proceeds to step b5, where the control circuit 2 is notified to perform an incoming call refusal procedure (radio disconnection procedure) so that the operation to respond to the calling station is not performed. Then, the process returns to step b3. When S=0 at step b4, the process proceeds to step b6, where the control circuit 2 is notified to perform the normal termination response operation, that is, the operation to respond to the calling station. Then, the process returns to step b3.

According to the first operation, during the incoming call operation performed by the radio telephone apparatus 1a, the response operation is performed in accordance with the movement speed of the radio telephone apparatus 1a on the basis of the setting of the flag S. However, the incoming call operation is performed irrespective of the movement speed of the radio telephone apparatus 1a, that is, even when the radio telephone apparatus 1a is moving at high speed. Therefore, the user of the radio telephone apparatus 1a can be notified of the arrival of a call irrespective of the movement speed. In the first operation, the operation to respond to the calling station is not performed when the radio telephone apparatus 1a is moving at high speed. However, since the incoming call operation is performed even in such a case, the user of the radio telephone apparatus 1a can be notified of the arrival of a call.

Figure 4:
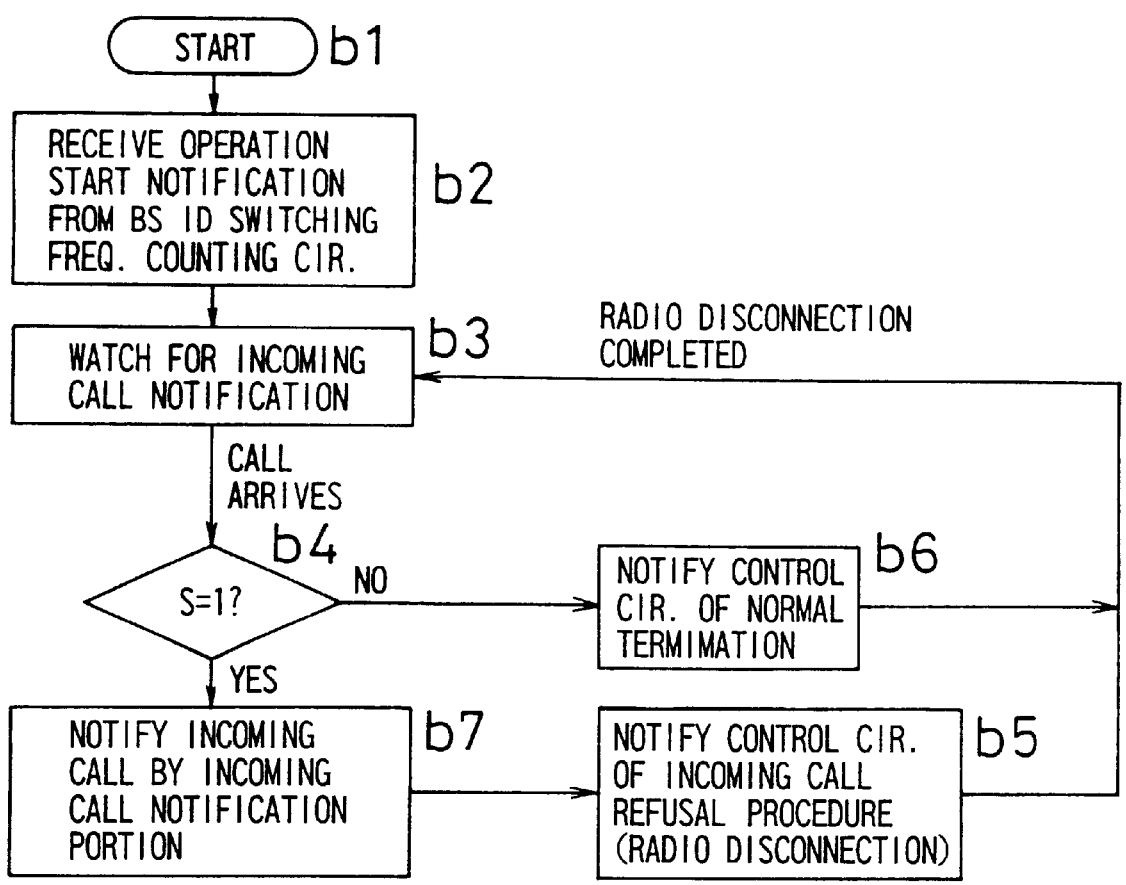
FIG. 4 is a flowchart for explaining a judgment operation performed by the response judgment circuit 12 during a second operation.

FIG. 4 is a flowchart for explaining a judgment operation performed by the response judgment circuit 12 during the second operation. Of the base station ID management circuit 9, the timer counter 10, the base station ID switching frequency counting circuit 11, the judgment response circuit 12, the incoming call notification portion 13 and the caller information notification portion 14, the elements other than the caller information notification portion 14 realize the second operation. The switching frequency counting operation performed by the base station ID switching frequency counting circuit 11 is the same as that of the first operation and will not be described again. In the flowchart of FIG. 4, steps where the same operations as those of the flowchart of FIG. 3 are performed are denoted by the same step numbers.

When the judgment operation is started at step b1, the process proceeds to step b2, where operation start notification from the base station ID switching frequency counting circuit 11 is received. At the next step b3, incoming call notification from a base station is watched for. When incoming call notification arrives, the process proceeds to step b4, where it is judged whether or not the flag S=1. When S=1, the process proceeds to step b7, where the incoming call notification portion 13 notifies the user of the arrival of a call. Then, the process proceeds to step b5, where the control circuit 2 is notified not to perform the operation to respond to the calling station. Then, the process returns to step b3. When S=0 at step b4, the process proceeds to step b6, where the control circuit 2 is notified to perform the normal termination response operation. Then, the process returns to step b3.

According to the second operation, during the incoming call operation performed by the radio telephone apparatus 1a, when the apparatus 1a is moving at high speed, the user can be informed of the arrival of a call by vibration by realizing the incoming call notification portion 13 in the form of a vibration output device. It is desirable to notify the user of the arrival of a call by vibration when the user is in a public space, for example, on a train because notification by vibration does not make people around the user unpleasant.

Figure 5:
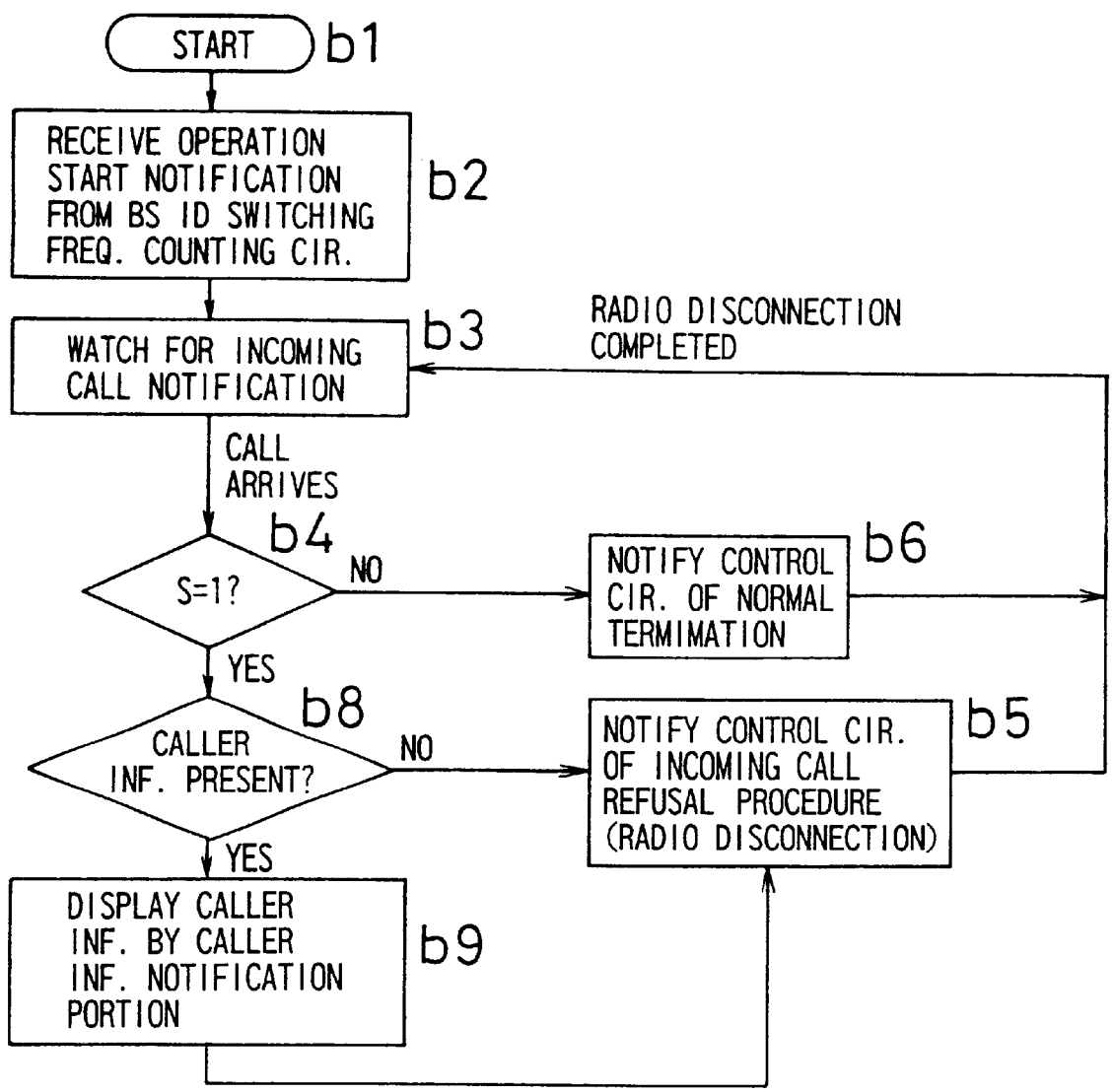
FIG. 5 is a flowchart for explaining a judgment operation performed by the response judgment circuit 12 during a third operation.

FIG. 5 is a flowchart for explaining a judgment operation performed by the response judgment circuit 12 during the third operation. The third operation is realized by the base station ID management circuit 9, the timer counter 10, the base station ID switching frequency counting circuit 11, the response judgment circuit 12 and the caller information notification portion 14. The operation performed by the base station ID switching frequency counting circuit 11 is the same as that of the first operation and will not be described again. In the flowchart of FIG. 5, steps where the same operations as those of the flowchart of FIG. 3 are performed are denoted by the same step numbers.

When the judgment operation is started at step b1, the process proceeds to step b2, where operation start notification from the base station ID switching frequency counting circuit 11 is received. At the next step b3, incoming call notification from a base station is watched for. When incoming call notification arrives, the process proceeds to step b4, where it is judged whether or not the flag S=1. When S=1, the process proceeds to step b8, where it is judged whether caller information is present or not. When caller information is present, the process proceeds to step b9, where the caller information notification portion 14 notifies the user of the caller information. Then, the process proceeds to step b5, where the control circuit 2 is notified not to perform the operation to respond to the calling station. Then, the process returns to step b3. When no caller information is present at step b8, the process directly proceeds to step b5. When S=0 at step b4, the process proceeds to step b6, where the control circuit 2 is notified to perform the normal terminaiton response operation. Then, the process returns to step b3. The caller information notification portion 14 is realized, for example, in the form of a display device. Caller information such as the caller's telephone number is displayed so that the user is notified of the information.

According to the third operation, since the user of the radio telephone apparatus 1a is also notified of caller information by the caller information notification portion 14 when the incoming call refusal operation is performed while the apparatus 1a is moving at high speed during the incoming call operation performed by the radio telephone apparatus 1a, the user can be notified of the arrival of a call and identify the caller on the basis of the caller information. When the user cannot respond to the call immediately, the user can easily call the caller later on the basis of the caller information.

While in the above-described embodiment, the number of swichings N is counted and compared with the predetermined reference number of times N0 and it is judged that the radio telephone apparatus 1a is moving at high speed when the number times of switching N exceeds the reference number of times N0, the method of judging whether the apparatus 1a is moving at high speed or not is not limited thereto. For example, the radio telephone apparatus may be judged as moving at high speed when the counted time exceeds a predetermined time like in JP-A 6-133355.

Figure 6:
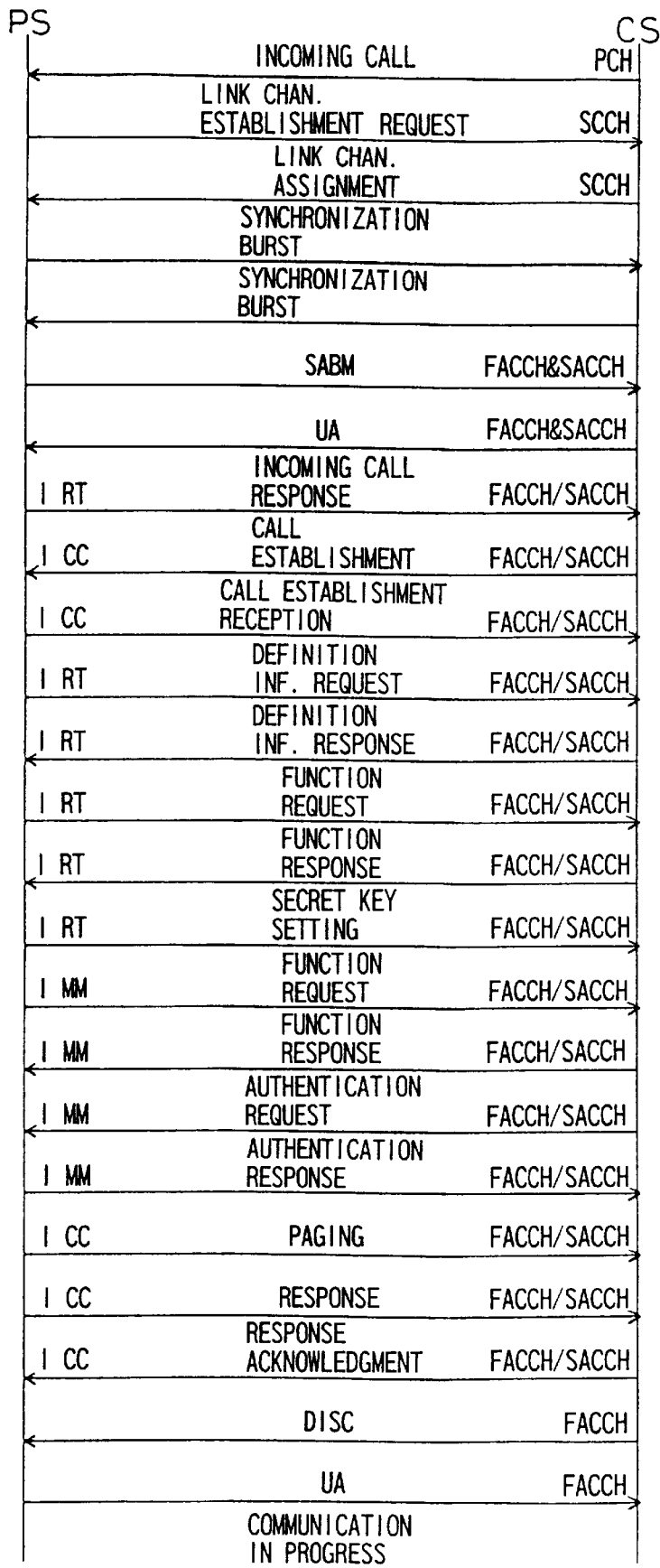
FIG. 6 is a view showing a control signal sequence between a PHS mobile station and a PHS network control station (exchange station) when a call arrives, in relation to the radio telephone apparatus 1a of the embodiment.
Figure 7:
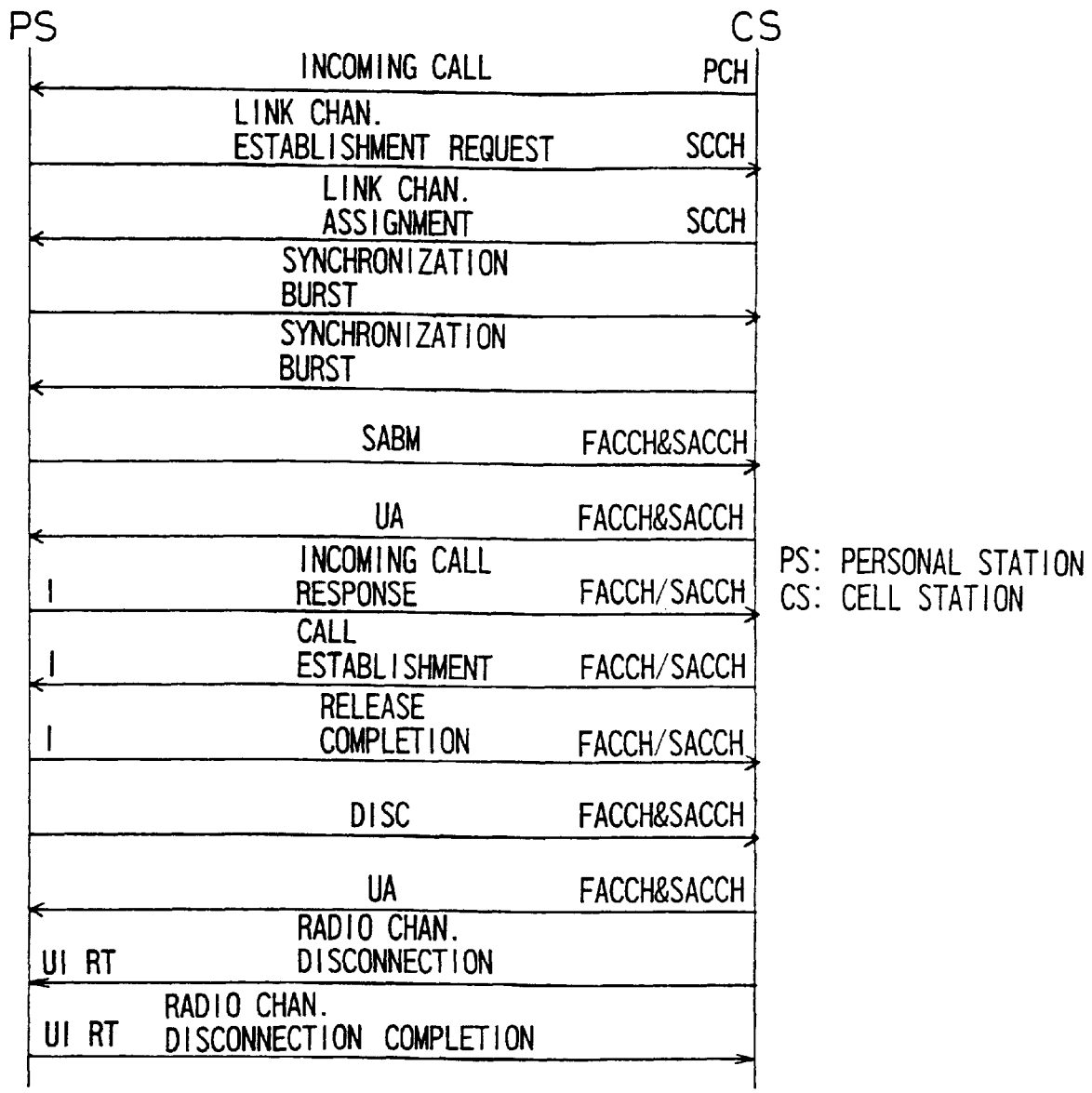
FIG. 7 is a view showing, with respect to step b5 of FIGS. 3 to 5, a control signal sequence when the radio communication channel is disconnected.

FIG. 6 is a view showing a control signal sequence between the mobile station and the network control station (exchange station) of a PHS when a call arrives, associated with the radio telephone apparatus 1a of the embodiment. FIG. 7 is a view showing, with respect to step b5 of FIGS. 3 to 5, a control signal sequence when the radio communication channel is disconnected. The sequence shown in FIG. 6 is quoted from "4.4.3.8.2 Incoming Call" of the second edition of "Second-generation Cordless Telephone System Standard (RCR-STD28)", published by Association of Radio Industries and Businesses."

The mobile station receives from a base station through a paging channel PCH an incoming call message for notifying the mobile station of the arrival of a call. Then, the mobile station sends to the base station through a separate cell channel SCCH a link channel establishment request message for exchanging radio signals with the base station. Then, the base station sends to the mobile station through SCCH an assignment of a radio channel for exchanging radio signals with the mobile station. Then, the mobile station sends to the base station a synchronization burst message for synchronizing the exchange of radio signals with the base station on the assigned radio channel. Then, as the response message, the base station sends a synchronization burst message to the mobile station.

Then, the mobile station sends to the base station an asynchronous balanced mode setting message SABM SACCH of an associated control channel SACCH. Then, the base station sends to the mobile station a message UA SACCH for acknowledging the message SABM SACCH. Then, the mobile station sends to the base station an asynchronous balanced mode setting message SABM FACCH of an associated control channel FACCH for exchanging the messages from the incoming call response message to the response acknowledgment message at high speed. Then, the base station sends to the mobile station a message UA FACCH for acknowledging the message SABM FACCH. In FIG. 6, the messages are represented by SABM FACCH&SACCH and UA FACCH&SACCH for simplicity. Then, the exchange of the messages from the incoming call response message to the response acknowledgment message is performed through the channel SACCH or FACCH. This is represented by SACCH/FACCH in FIG. 6.

Then, the mobile station sends the incoming call response message to the base station. The base station sends a call establishment message including caller information to the mobile station. The mobile station sends to the mobile station a call establishment reception message as the reception message. Then, the mobile station sends a definition information request message to the base station. Receiving the message, the base station sends a definition information response message to the mobile station. Then, the mobile station sends a radio transmission (referred to as RT) function request message to the base station to request an RT function from the base station. The base station sends the response as an RT function request response message to the mobile station. The mobile station sends a secret key message to the base station to notify the base station of the secret key. Then, the mobile station sends a mobility management (referred to as MM) function request message to the base station to request an MM function from the base station. The base station sends the response as an MM function request response message to the mobile station.

Then, the mobile station is notified of an authentication random number issued by the base station. The mobile station calculates the random number by use of an authentication key that the mobile station has, and sends to the base station an authentication response message which is the result of the calculation. The base station calculates like the mobile station the authentication random number issued by the base station itself by use of the previously stored authentication key of the mobile station, and judges whether or not the result of the calculation performed by the base station itself agrees with the calculation result sent from the mobile station. When the calculation results agree with each other, paging connection is continued. When the calculation results disagree, a paging release procedure is started. Then, the mobile station sends a paging message to the base station to display that the mobile station is being paged, and causes the ringer to ring. When the user of the mobile station answers the incoming call, the mobile station sends a response message to the base station. The base station sends as the response a response acknowledgment message to the mobile station. Lastly, the base station sends a disconnection massage DISC FACCH to the mobile station and the mobile station sends the response message UA FACCH to the base station. Then, the mobile station and the base station shift to a communication state.

In the case of FIGS. 3 and 4, it is necessary for the mobile station to recognize an incoming call and refuse the incoming call without shifting to a state of communication with the calling station. In the case of FIG. 5, in addition, it is necessary for the mobile station to confirm the presence or absence of caller information, obtain the information when caller information is present and refuse the incoming call without shifting to a state of communication with the calling station. Therefore, in FIGS. 3 to 5, the mobile station, like in FIG. 7, exchanges the messages from the incoming call message to the call establishment message, sends to the base station a release completion message through SACCH or FACCH to refuse the incoming call, and then, performs a procedure to disconnect the radio communication channel.

In the radio communication channel disconnection procedure, the mobile station sends to the base station a message for disconnecting the radio DISC FACCH&SACCH, the base station sends the response message UA FACCH&SACCH to the mobile station, the base station sends a radio channel disconnection message to the mobile station, and the mobile station sends a radio channel disconnection completion message to the base station.

Figure 8:
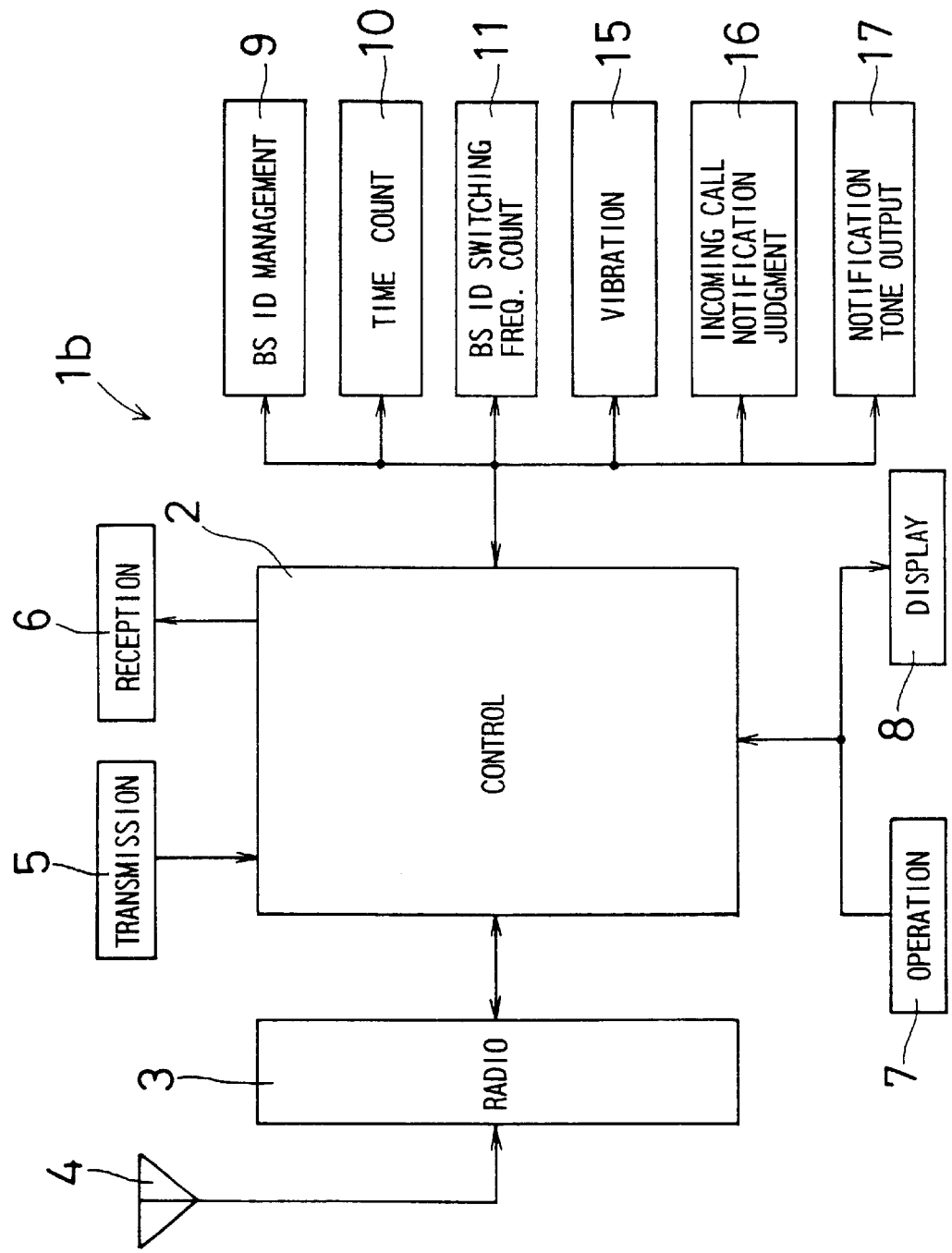
FIG. 8 is a block diagram showing a radio telephone apparatus 1b according to a second embodiment of the invention.

FIG. 8 is a block diagram showing the electric structure of a radio telephone apparatus 1b according to a second embodiment of the invention. The radio telephone apparatus 1b structured substantially similarly to the radio telephone apparatus 1a has a vibrator 15, an incoming call notification judgment circuit 16 and a notification tone output portion 17 instead of the response judgment circuit 12, the incoming call notification portion 13 and the caller information notification portion 14.

Like in the above-described embodiment, the base station ID management circuit 9 monitors a base station which can perform radio communication with the radio telephone apparatus 1b, grasps the condition of the connection between the radio telephone apparatus 1b and the base station, and stores the ID of the communication possible base station into the memory M. The timer counter 10 counts a predetermined unit time. The base station ID switching frequency counting circuit 11 counts the number of times N the communication possible base station has been switched within the counted unit time. The control circuit 2 compares the counted number of times of switching N with the predetermined reference number of times N0, and judges whether the number of times of switching N exceeds the reference number of times N0 or not. When the number of times of switching N exceeds the reference number of times N0, the control circuit 2 judges that the radio telephone apparatus 1b is moving at high speed, and sets the flag S to 1. When the number of times of switching N does not exceed the reference number of times N0, the control circuit 2 judges that the radio telephone apparatus 1b is not moving at high speed, and sets the flag S to 0.

The vibrator 15 vibrates the radio telephone apparatus 1b itself. The notification tone output portion 17 realized, for example, in the form of a tone ringer outputs an incoming call notification tone and various other notification tones. The incoming call notification judgment circuit 16 selectively judges the activation or deactivation of the vibrator 15 and the notification tone output portion 17 in accordance with the movement speed of the radio telephone apparatus 1b. Specifically, when the radio telephone apparatus 1b is not moving at high speed, the notification tone output portion 17 is activated so that incoming call notification is provided by causing the ringer to ring. At this time, the vibrator 15 may be deactivated so that the notification is provided only by sound, or the vibrator 15 may be activated so that the notification is provided by both sound and vibration. When the radio telephone apparatus 1b is moving at high speed, the vibrator 15 is activated so that incoming call notification is provided by vibration. At this time, the notification tone output portion 17 is deactivated so that the notification is provided only by vibration. Although it is possible to provide the notification by both sound and vibration by activating the notification sound output portion 17, since the user of the radio telephone apparatus 1b is very likely to be in a public space such as on a train when the apparatus 1b is moving at high speed, it is preferable to provide the notification only by vibration because notification by vibration does not make people around the user unpleasant.

Figure 9:
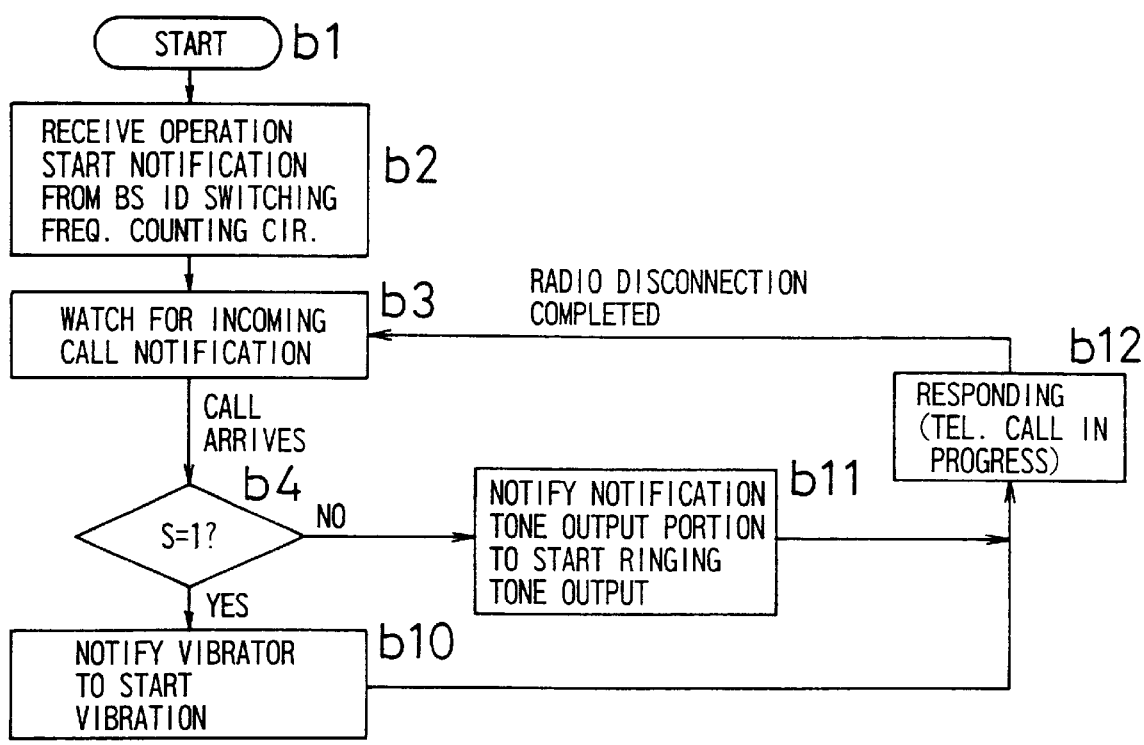
FIG. 9 is a flowchart for explaining a judgment operation performed by an incoming call notification judgment circuit 16.

The switching frequency counting operation performed by the base station ID switching frequency counting circuit 11 is similar to that of FIG. 2. FIG. 9 is a flowchart for explaining a judgment operation performed by the incoming call notification judgment circuit 16. In this flowchart, steps b10 to b12 are added instead of steps b5 and b6 of the flowchart of FIG. 3 showing the judgment operation performed by the response judgment operation 12. When the judgment operation is started at step b1, the process proceeds to step b2, where the incoming call notification judgment circuit 16 receives operation start notification from the base station ID switching frequency counting circuit 11. At the next step b3, incoming call notification from a base station is watched for. When incoming call notification arrives, the process proceeds to step b4, where it is judged whether or not the flag S=1, that is, whether the radio telephone apparatus 1b is moving at high speed or not. When S=1, the process proceeds to step b10, where the vibrator 15 is notified to start a vibration operation. Then, the process proceeds to step b12. At step b12, it is judged that the radio telephone apparatus 1b is responding to the calling station (a telephone call is in progress between the apparatus 1b and the calling station). Then, the process returns to step b3.

When S=0 at step b4, the process proceeds to step b11, where the notification tone output portion 17 is notified to start an ringing tone output operation. Then, the process proceeds to step b12.

According to the radio telephone apparatus 1b of the second embodiment, since incoming call notification can be provided by an appropriate method in accordance with the movement speed and can be provided by vibration when the user of the radio telephone apparatus 1b is moving at high speed, for example, on a train, people around the user are never made unpleasant.

Figure 10:
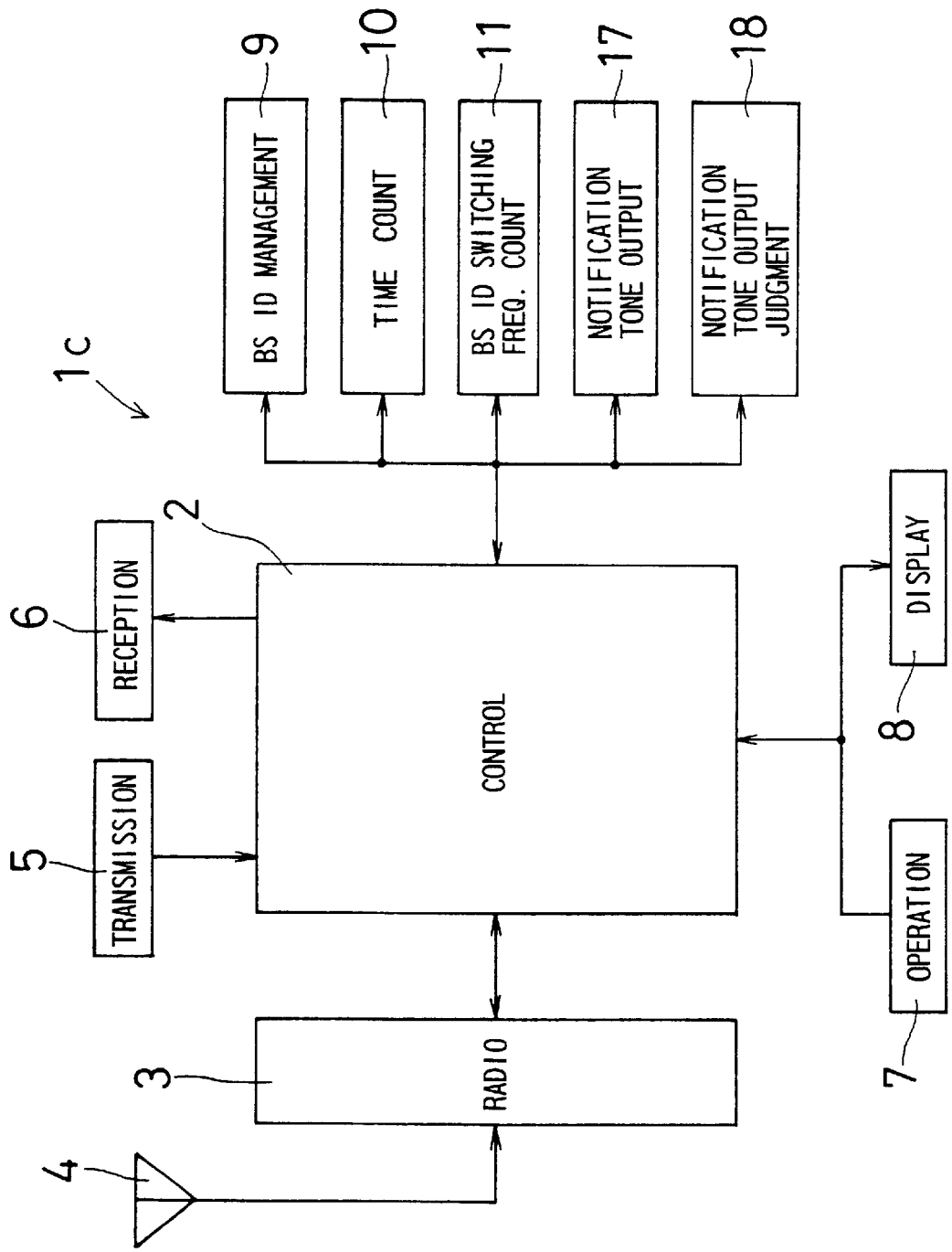
FIG. 10 is a block diagram showing a radio telephone apparatus 1c according to a third embodiment of the invention.

FIG. 10 is a block diagram showing the electric structure of a radio telephone apparatus 1c according to a third embodiment of the invention. The radio telephone apparatus 1c structured substantially similarly to the radio telephone apparatus 1b has a notification tone output judgment circuit 18 instead of the vibrator 15 and the incoming call notification judgment circuit 16. The notification tone judgment circuit 18 selectively judges the output or non-output of the incoming call notification tone in accordance with the movement speed of the radio telephone apparatus 1c. Specifically, when the radio telephone apparatus 1c is not moving at high speed, the notification tone is outputted, and when the apparatus 1c is moving at high speed, the notification tone is not outputted.

Figure 11:
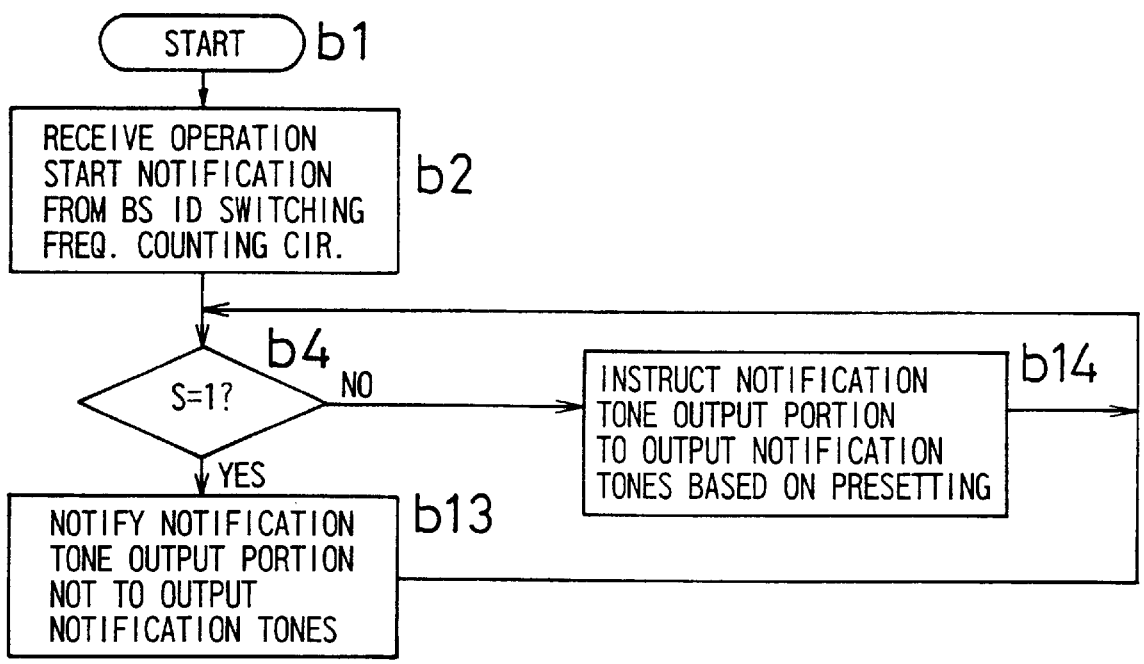
FIG. 11 is a flowchart for explaining a judgment operation performed by the notification tone output judgment circuit 18.

The switching frequency counting operation performed by the base station ID switching frequency counting circuit 11 is similar to that of FIG. 2. FIG. 11 is a flowchart for explaining a judgment operation performed by the notification tone output judgment circuit 18. In this flowchart, steps b13 and b14 are added instead of steps b3, b5 and b6 of the flowchart of FIG. 3 showing the judgment operation performed by the response judgment operation 12. When the judgment operation is started at step b1, the process proceeds to step b2, where the notification tone output judgment circuit 18 receives operation start notification from the base station ID switching frequency counting circuit 11. At the next step b4, it is judged whether or not the flag S=1, that is, whether the radio telephone apparatus 1c is moving at high speed or not. When S=1, the process proceeds to step b13, where the notification tone output portion 17 is notified not to output the notification tone. Then, the process returns to step b4. When S=0 at step b4, the process proceeds to step b14, where the notification tone output portion 17 is notified to output the notification tone. Then, the process returns to step b4.

According to the radio telephone apparatus 1c of the third embodiment, since notifications are not provided by sound while the radio telephone apparatus 1c is moving at high speed, people around the user of the apparatus 1c are never made unpleasant when the apparatus 1c is moving at high speed in a public space such as on a train. Since the user of the radio telephone apparatus 1c is never forced to perform telephone conversation with the user of the calling station when a call arrives, the user is never hindered, for example, from driving a car.

Figure 12:
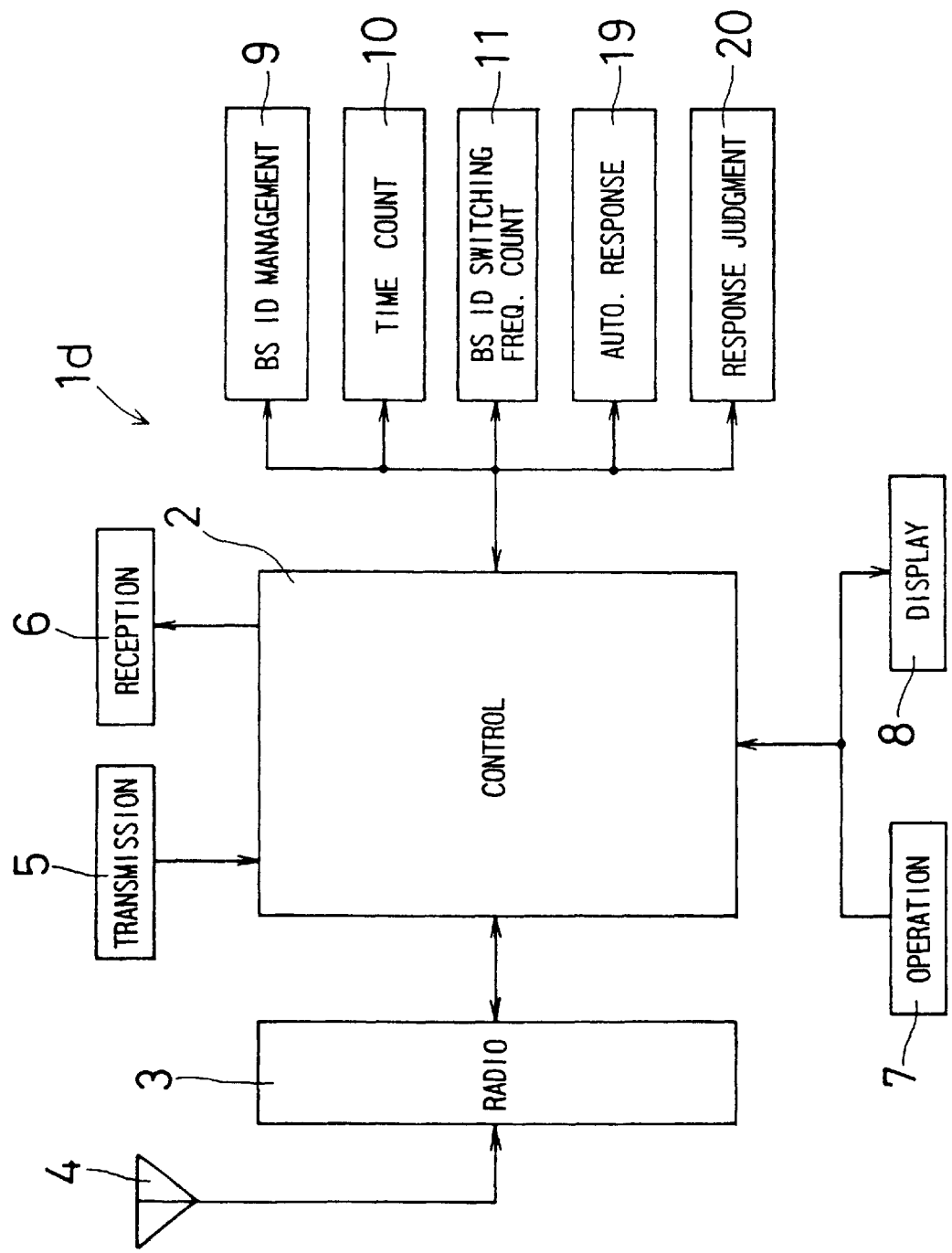
FIG. 12 is a block diagram showing a radio telephone apparatus 1d according to a fourth embodiment of the invention.

FIG. 12 is a block diagram showing the electric structure of a radio telephone apparatus 1d according to a fourth embodiment of the invention. The radio telephone apparatus 1d structured substantially similarly to the radio telephone apparatus 1a has an automatic response circuit 19 and a response judgment circuit 20 instead of the response judgment circuit 12, the incoming call notification portion 13 and the caller information notification portion 14. The automatic response circuit 19 automatically responds to incoming call notification from a base station and performs an automatic response operation to perform communication (telephone conversation) by reproducing a predetermined message and sending the message to the calling station. The response judgment circuit 20 selectively judges the execution or non-execution of the operation to automatically respond to the calling station in accordance with the movement speed of the radio telephone apparatus 1d when incoming call notification from the base station is received. Specifically, the response judgment circuit 20 selects so that the automatic response operation is not performed for incoming call notification received when the radio telephone apparatus 1d is not moving at high speed, and the automatic response operation is performed for incoming call notification received when the apparatus 1d is moving at high speed.

Figure 13:
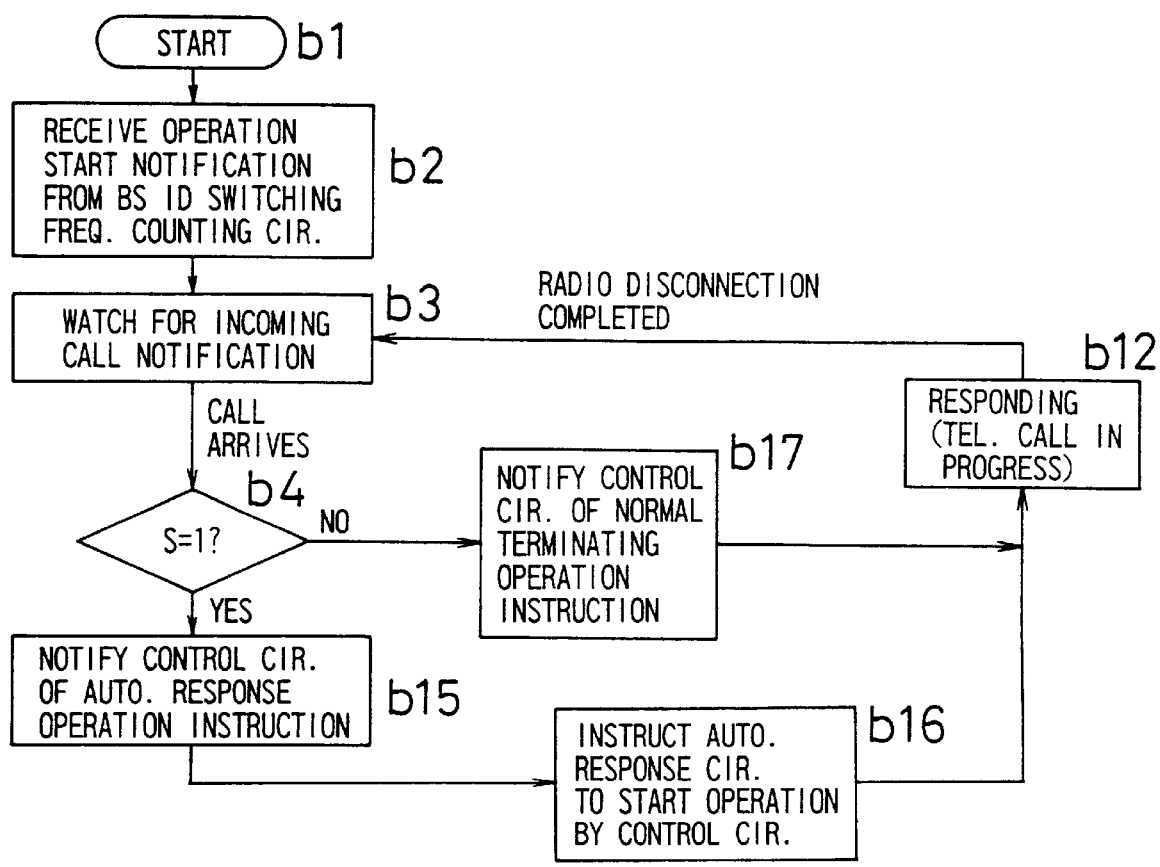
FIG. 13 is a flowchart for explaining a judgment operation performed by a response judgment circuit 20.

The switching frequency counting operation performed by the base station ID switching frequency counting circuit 11 is similar to that of FIG. 2. FIG. 13 is a flowchart for explaining a judgment operation performed by the response judgment circuit 20. In this flowchart, steps b15 to b17 are added instead of steps b10 and b11 of the flowchart of FIG. 9 showing the judgment operation performed by the incoming call notification judgment circuit 16. When the judgment operation is started at step b1, the process proceeds to step b2, where the response judgment circuit 20 receives operation start notification from the base station ID switching frequency counting circuit 11. At the next step b3, incoming call notification from a base station is watched for. When incoming call notification arrives, the process proceeds to step b4, where it is judged whether or not the flag S=1, that is, whether the radio telephone apparatus 1d is moving at high speed or not. When S=1, the process proceeds to step b15, where the control circuit 2 is notified to instruct the automatic response circuit 19 to perform the automatic response operation. Then, the process proceeds to step b16. At step b16, the control circuit 2 notifies the automatic response circuit 19 to start the automatic response operation. Then, the process proceeds to step b12. At step b12, it is judged that the radio telephone apparatus 1d is responding to the calling station (a telephone call is in progress between the apparatus 1d and the calling station). Then, the process returns to step b3. When S=0 at step b4, the process proceeds to step b17, where the control circuit 2 is notified not to perform the automatic response operation but to perform the normal response operation. Then, the process proceeds to step b12.

According to the radio telephone apparatus 1d of the fourth embodiment, the automatic response operation to the calling station is performed for incoming call notification received when the radio telephone apparatus id is moving at high speed, and the automatic response operation to the calling station is not performed but the normal response operation is performed for incoming call notification received when the apparatus 1d is not moving at high speed. Consequently, when the radio telephone apparatus 1d which is moving at high speed performs the incoming call operation, a predetermined message, for example, a message "This telephone is moving now. Please call again later." showing the radio telephone apparatus 1d is moving at high speed can be sent to the calling station. This frees the user of the radio telephone apparatus 1d from being forced to perform telephone conversation with the user of the calling station when a call arrives, so that the user is never hindered, for example, from driving a car. In addition, the user of the calling station can immediately grasp the condition of the radio telephone apparatus 1d and disconnect the line.

Figure 14:
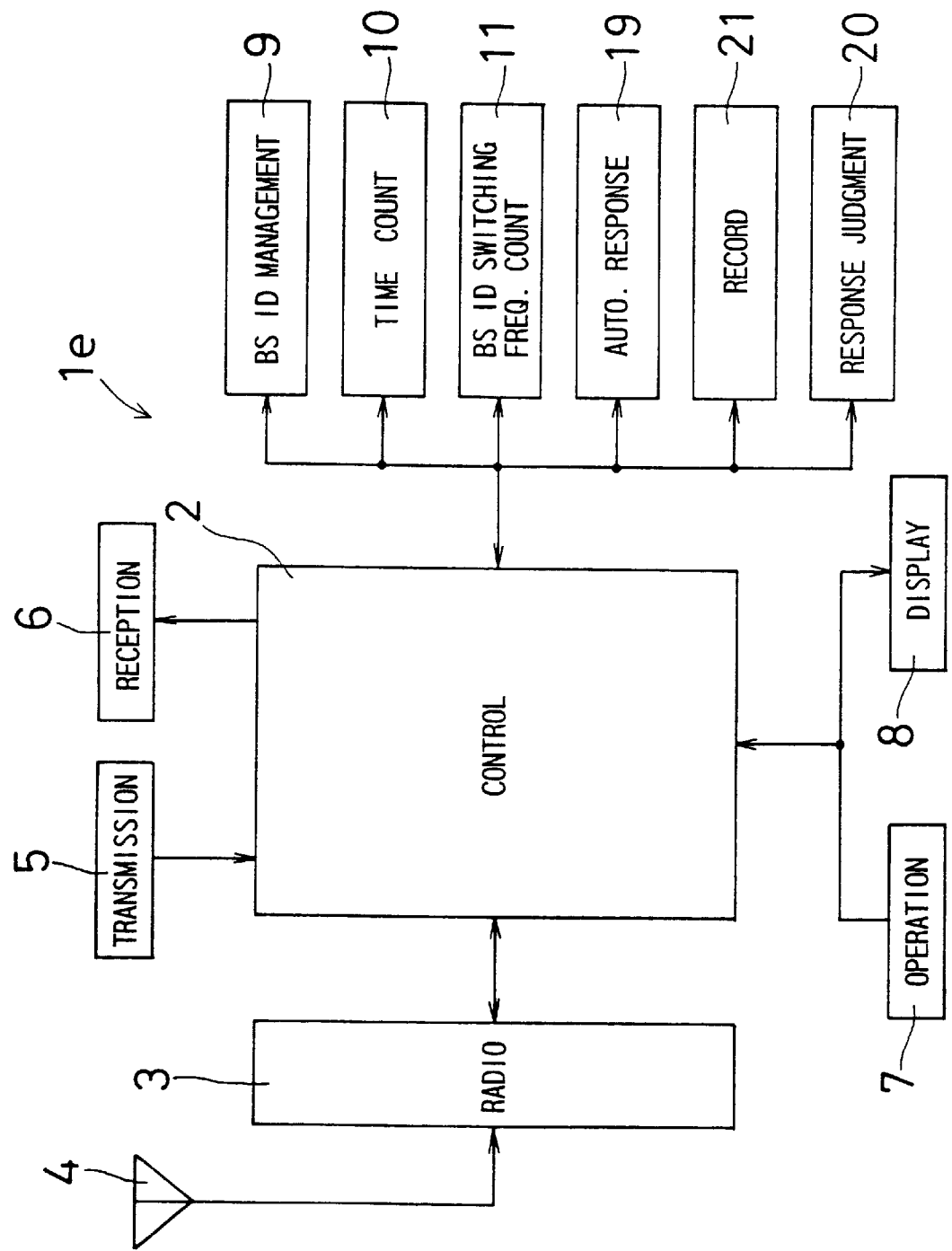
FIG. 14 is a block diagram showing a radio telephone apparatus 1e according to a fifth embodiment of the invention.
Figure 15:
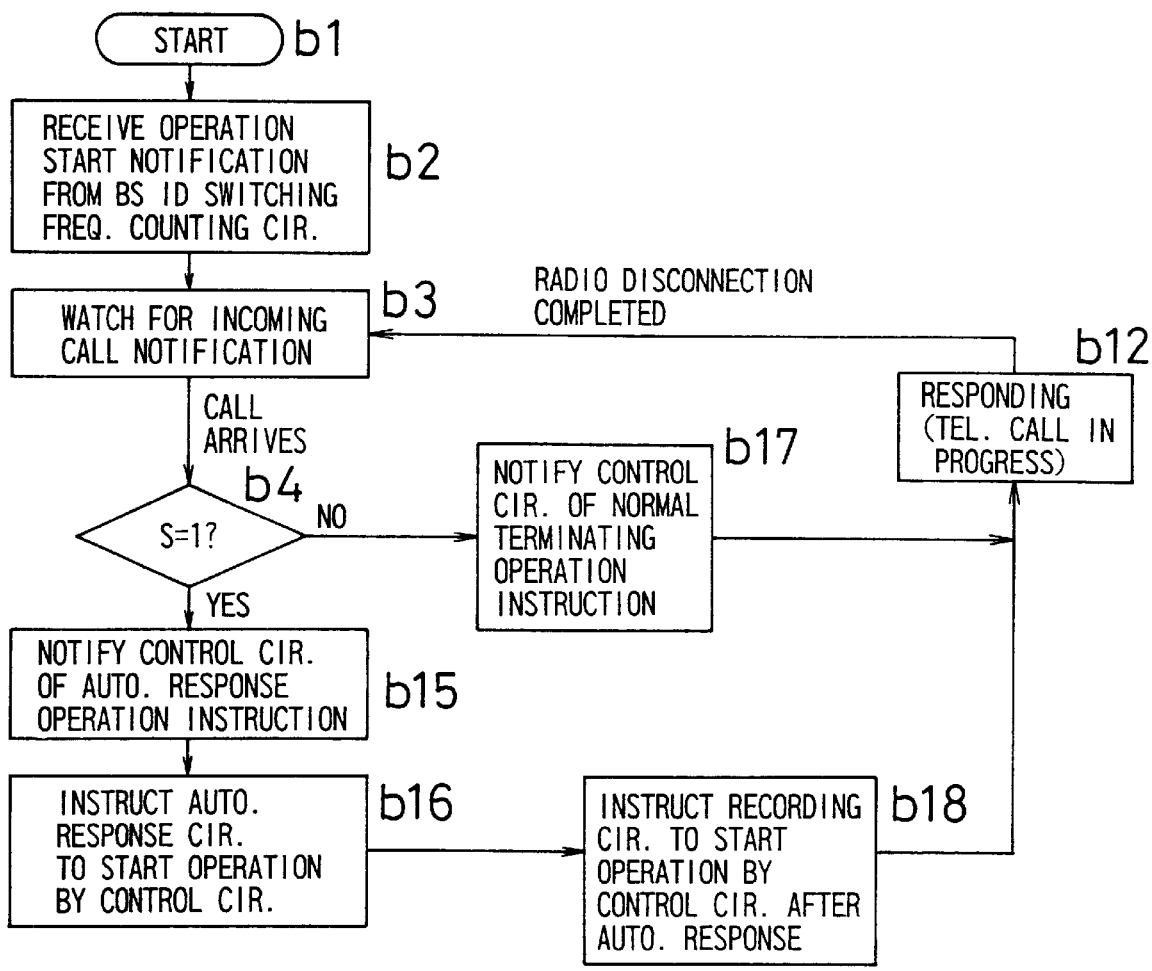
FIG. 15 is a flowchart for explaining a judgment operation performed by the response judgment circuit 20.

FIG. 14 is a block diagram showing the electric structure of a radio telephone apparatus 1e according to a fifth embodiment of the invention. The radio telephone apparatus 1e structured substantially similarly to the radio telephone apparatus 1d is further provided with a recording circuit 21 for recording a message from the calling station. FIG. 15 is a flowchart for explaining a judgment operation performed by the response judgment circuit 20. In this flowchart, step b18 is added to the flowchart of FIG. 13 showing the judgment operation performed by the response judgment circuit 20, and the operations of similar steps will not be described again. When the control circuit 2 notifies the automatic response circuit 19 to start the automatic response operation at step b16, the process proceeds to step b18 and further proceeds to step b12. At step b18, after the automatic response operation is performed by the automatic response circuit 19, the control circuit 2 notifies the recording circuit 21 to start a recording operation to record a message from the calling station.

According to the radio telephone apparatus 1e of the fifth embodiment, by the high-speed-moving radio telephone apparatus 1e performing the incoming call operation, a message sent from the calling station in response to a predetermined message sent to the calling station can be recorded. Consequently, the user of the radio telephone apparatus 1e never misses the business of an incoming call. Since the user of the calling station can send the business of the incoming call, it is unnecessary for the user to call again. Consequently, the user of the calling station is never made unpleasant.

Figure 16:
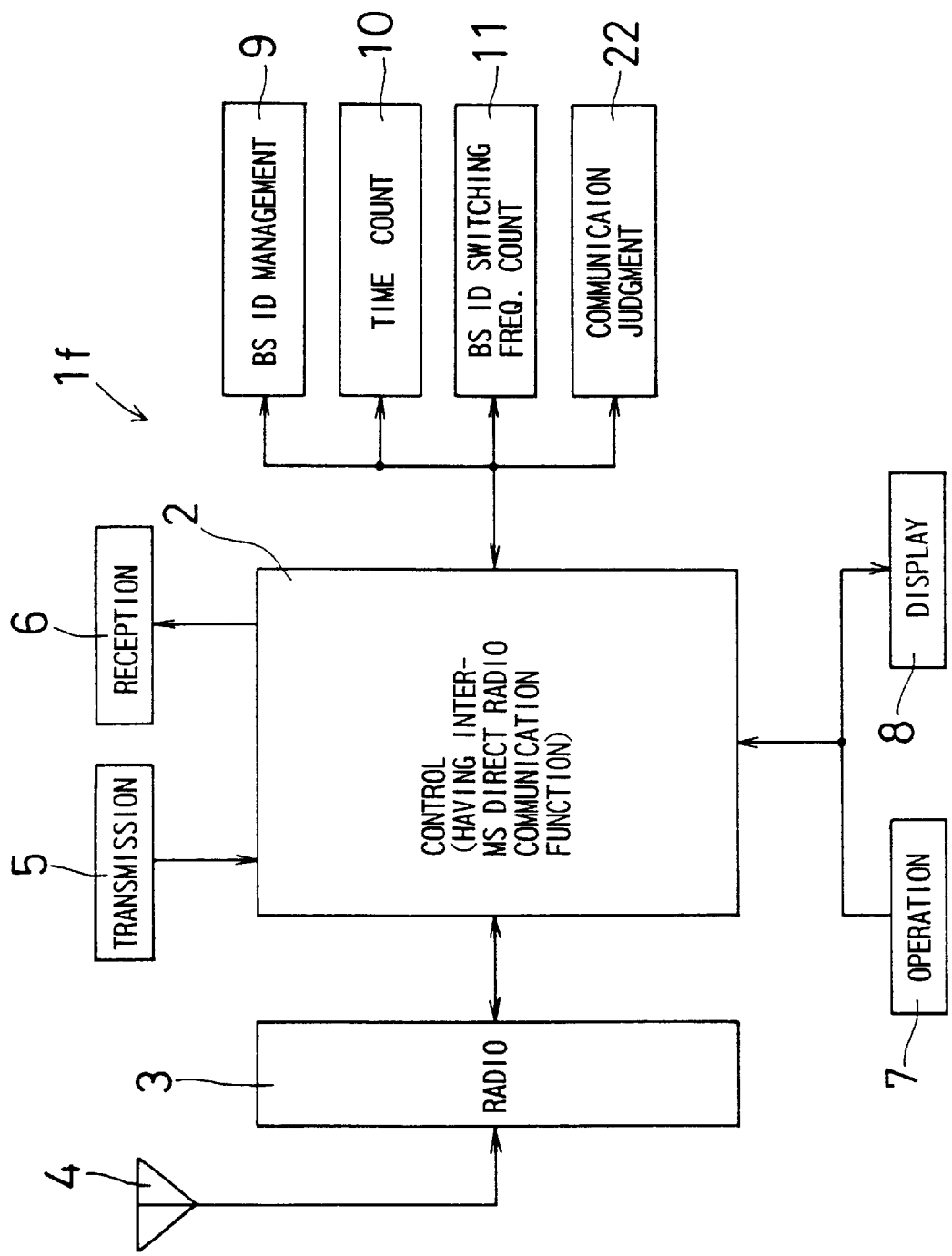
FIG. 16 is a block diagram showing a radio telephone apparatus 1f according to a sixth embodiment of the invention.

FIG. 16 is a block diagram showing the electric structure of a radio telephone apparatus 1f according to a sixth embodiment of the invention. The radio telephone apparatus 1f structured substantially similarly to the radio telephone apparatus 1a has a communication judgment circuit 22 instead of the response judgment circuit 12, the incoming call notification portion 13 and the caller information notification portion 14. The radio telephone apparatus 1f is structured so that radio communication can be directly performed between mobile stations by the control circuit 2. That is, radio communication is directly performed between mobile stations not through a base station or the exchange station but by use of the radio portion 3 and the antenna 4. Hereinafter, this type of communication will be referred to as inter-mobile station direct radio communication mode (second communication mode). The type of communication by a PHS as described in the first to the fifth embodiments will be referred to as normal communication mode (first communication mode). The communication judgment circuit 22 selectively judges the communication mode in accordance with the movement speed of the radio telephone apparatus 1f. Specifically, when the radio telephone apparatus 1f is not moving at high speed, the communication judgment circuit 22 selects the normal communication mode, and when the apparatus 1f is moving at high speed, the circuit 22 selects the inter-mobile station direct radio communication mode.

Figure 17:
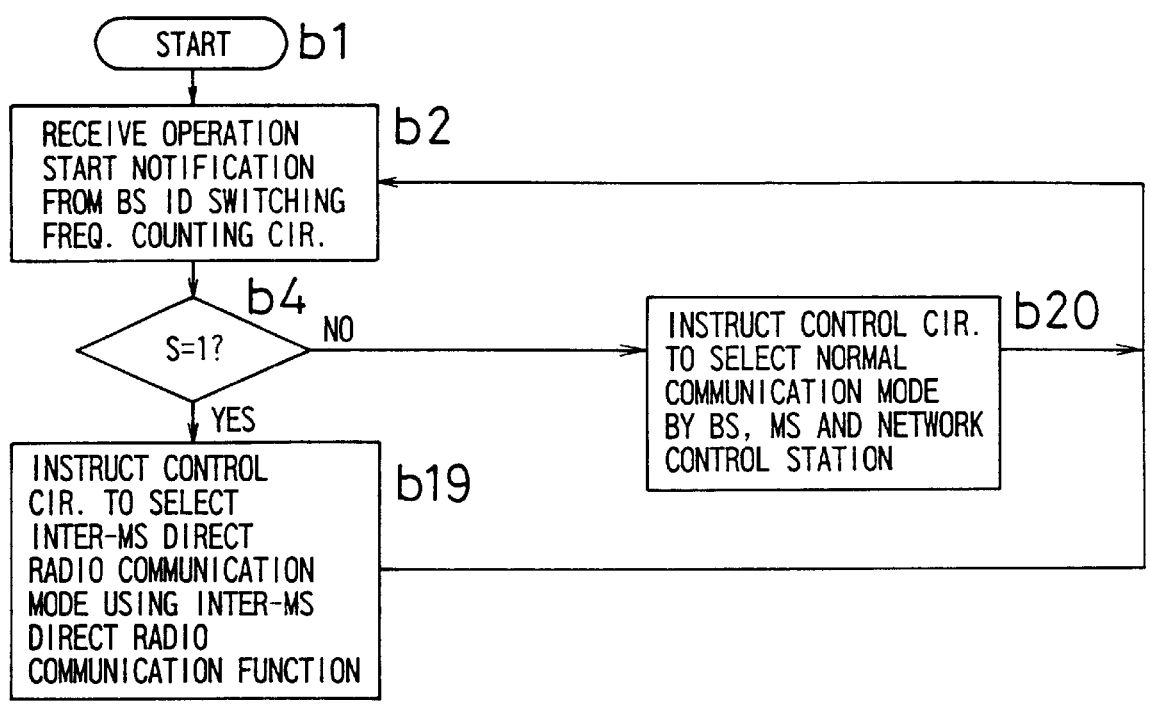
FIG. 17 is a flowchart for explaining a judgment operation performed by a communication judgment circuit 22.

The switching frequency counting operation performed by the base station ID switching frequency counting circuit 11 is similar to that of FIG. 2. FIG. 17 is a flowchart for explaining a judgment operation performed by the communication judgment circuit 22. In this flowchart, steps b19 and b20 are added instead of steps b3, b5 and b6 of the flowchart of FIG. 3 showing the judgment operation performed by the response judgment circuit 12. When the judgment operation is started at step b1, the process proceeds to step b2, where the communication judgment circuit 22 receives operation start notification from the base station ID switching frequency counting circuit 11. At the next step b4, it is judged whether or not the flag S=1, that is, whether the radio telephone apparatus 1f is moving at high speed or not. When S=1, the process proceeds to step b19, where the control circuit 2 is notified to select the inter-mobile station direct radio communication mode. Then, the process returns to step b2. When S=0 at step b4, the process proceeds to step b20, where the control circuit 2 is notified not to select the normal communication mode. Then, the process returns to step b2.

According to the radio telephone apparatus 1f of the sixth embodiment, since the radio telephone apparatus 1f selectively executes either the normal communication mode or the inter-mobile station direct radio communication mode by switching between the two modes, an appropriate communication mode can be executed in accordance with the movement speed of the radio telephone apparatus 1f, so that telephone communication can be performed with stability. Particularly, when the radio telephone apparatus 1f is moving at high speed within the radio area of a base station, the radio telephone apparatus 1f selects and executes the inter-mobile station direct radio communication mode. Consequently, when the radio telephone apparatus 1f is comparatively near the calling station, even if the radio telephone apparatus 1f is moving at high speed, the communication mode enables stable telephone communication.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A radio telephone apparatus which serves as a mobile station that performs radio telephone communication with another station through one of a plurality of base stations having at least one radio communication area, and is provided with incoming call operation performing means for detecting incoming call notification from a base station and response operation performing means for responding to the incoming call notification, the radio telephone apparatus comprising:

monitoring means for monitoring which of the base stations in a call-waiting state can perform communication with the radio telephone apparatus, wherein the base stations in the call-waiting state with which the radio telephone apparatus can perform communication switch as the location of the radio telephone apparatus changes;

judging means for judging whether the radio telephone apparatus is moving at high speed or not on the basis of the rate of switching of base stations in the call-waiting state with which the radio telephone apparatus can perform communication; and response controlling means for controlling the response operation performing means so as not to perform an operation to respond to a calling station after an incoming call operation is performed when the radio telephone apparatus is moving at high speed as judged by the judging means based on judging of the base station switching rate prior to the incoming call notification.

2. The radio telephone apparatus of claim 1, the apparatus further comprising incoming call notifying means for providing incoming call notification on the basis of control by the response controlling means when the radio telephone apparatus performs the incoming call operation.

3. The radio telephone apparatus of claim 2, wherein the incoming call notifying means is a sound output device, and outputs no sound when the radio telephone apparatus is moving at high speed.

4. The radio telephone apparatus of claim 2, wherein the incoming call notifying means is a sound and vibration output device, and outputs vibration when the radio telephone apparatus is moving at high speed and outputs sound when the radio telephone apparatus is not moving at high speed.

5. The radio telephone apparatus of claim 1, the apparatus further comprising information outputting means for outputting caller information from the calling station when the radio telephone apparatus is moving at high speed during the incoming call operation.

6. The radio telephone apparatus of claim 1, the apparatus further comprising:

a sound output device for outputting sound; and sound output controlling means for controlling the sound output device so as not to output sound on the basis of control by the response controlling means when the radio telephone apparatus is moving at high speed.

7. The radio telephone apparatus of claim 1, the apparatus further comprising:

reproducing means for reproducing a predetermined message; and reproduction controlling means for controlling the operation performed by the reproducing means so as to reproduce the message on the basis of control by the response controlling means, and sending the reproduced message to the calling station when the radio telephone apparatus is moving at high speed during the incoming call operation.

8. The radio telephone apparatus of claim 7, the apparatus further comprising recording means for recording a message from the calling station responding to the reproduced message being sent.

9. A radio telephone apparatus comprising:

first communication mode executing means for performing radio telephone communication between a mobile station and another station through one of a plurality of base stations having at least one radio communication area;

second communication mode executing means for directly performing radio communication between mobile stations;

mode selecting means for selecting either the first or the second communication mode by switching therebetween;

incoming call operation performing means for performing an incoming call operation to detect incoming call notification from a base station;

response operation performing means for performing a response operation to respond to the incoming call notification;

monitoring means for monitoring which of the base stations in a call-waiting state can perform radio communication with the radio telephone apparatus, wherein the base stations in the call-waiting state with which the radio telephone apparatus can perform communication switch as the location of the radio telephone apparatus changes; and judging means for judging whether the radio telephone apparatus is moving at high speed or not on the basis of the rate of switching of base stations in the call-waiting state with which the radio telephone apparatus can perform communication, wherein the mode selecting means selects the second communication mode when the radio telephone apparatus is moving at high speed as judged by the judging means based on judging of the base station switching rate prior to the incoming call notification.

10. A mobile radio communication apparatus comprising:

radio circuitry for communicating with base stations;

speed judging circuitry for judging whether the mobile radio communication apparatus is moving at high speed based on the rate of switching of base stations in a call-waiting state with which the mobile radio communication apparatus can perform communication; and response control circuitry for controlling incoming call response operations of the mobile radio communication apparatus for an incoming call in accordance with whether the mobile radio communication apparatus is moving at high speed as judged by the speed judging circuitry based on judging of the base station switching rate prior to the incoming call.

11. The mobile radio communication apparatus according to claim 10, further comprising a memory storing a flag whose state indicates whether the mobile radio communication apparatus is moving at high speed.

12. The mobile radio communication apparatus according to claim 10, wherein the incoming call response operations include an incoming call refusal operation which is performed if the mobile radio communication apparatus is moving at high speed.

13. The mobile radio communication apparatus according to claim 12, wherein the incoming call response operations include an incoming call notification operation, which is performed prior to the incoming call refusal operation, to inform a user of an incoming call.

14. The mobile radio communication apparatus according to claim 13, wherein the incoming call notification operation generates vibrations of the mobile radio communication apparatus.

15. The mobile radio communication apparatus according to claim 12, wherein the incoming call response operations include a caller notification operation, which is performed prior to the incoming call refusal operation, to inform a user of calling party information.

16. The mobile radio communication apparatus according to claim 15, wherein the caller information notification operation comprises generating a display of calling party information.

17. A mobile radio communication apparatus comprising:

radio circuitry for communicating with base stations;

speed judging circuitry for judging whether the mobile radio communication apparatus is moving at high speed based on the rate of switching of base stations in a call-waiting state with which the mobile radio communication apparatus can perform communication; and an automatic response circuit for performing an automatic incoming call response operation in which an automatic response is provided to a calling party if the mobile radio communication apparatus for an incoming call is moving at high speed as judged by the speed judging circuitry based on judging of the base station switching rate prior to the incoming call.

18. The mobile radio communication apparatus according to claim 17, further comprising message recording circuitry for performing, after the automatic incoming call response operation, a message recording operation for recording a message from the calling party.

19. A mobile radio communication apparatus comprising:

radio circuitry for communicating with base stations;

speed judging circuitry for judging whether the mobile radio communication apparatus is moving at high speed based on the rate of switching of base stations in a call-waiting state with which the mobile radio communication apparatus can perform communication; and a communication mode selection circuit for selecting between a first communication mode and a second communication mode in accordance with whether the mobile radio communication apparatus for an incoming call is moving at high speed as judged by the speed judging circuitry based on judging of the base station switching rate prior to the incoming call.

20. The mobile radio communication apparatus according to claim 19, wherein the first communication mode is a mobile communication mode and the second communication mode is an inter-mobile station direct radio communication mode.

21. A mobile radio communication apparatus comprising:

radio circuitry for communicating with base stations;

speed judging circuitry for judging in a call-waiting state whether the mobile radio communication apparatus is moving at high speed; and response control circuitry for controlling incoming call response operations of the mobile radio communication apparatus for an incoming call in accordance with whether the mobile radio communication apparatus is moving at high speed as judged by the speed judging circuitry based on judging of the base station switching rate prior to the incoming call.

22. The mobile radio communication apparatus according to claim 21, further comprising a memory storing a flag whose status indicates whether the mobile radio communication apparatus is moving at high speed.

23. The mobile radio communication apparatus according to claim 21, wherein the incoming call response operations include an incoming call refusal operation which is performed if the mobile radio communication apparatus is moving at high speed.

24. The mobile radio communication apparatus according to claim 23, wherein the incoming call response operations include a caller information notification operation, which is performed prior to the incoming call refusal operation, to inform a user of calling party information.

25. The mobile radio communication apparatus according to claim 24, wherein the caller information notification operation comprises generating a display of calling party information.

26. The mobile radio communication apparatus according to claim 23, wherein the incoming call response operations including an incoming call notification operation, which is performed prior to the incoming call refusal operation, to inform a user of an incoming call.

27. The mobile radio communication apparatus according to claim 26, wherein the incoming call notification operation generates vibrations of the mobile radio communication apparatus.

28. The mobile radio communication apparatus according to claim 21, wherein the speed judging circuitry judges whether the mobile radio communication apparatus is moving at high speed based on the rate of switching of base stations in a call-waiting state with which the mobile radio communication apparatus can perform communication.

* * * * *